United States Patent [19]

Hunter

[11] Patent Number: 5,032,474
[45] Date of Patent: Jul. 16, 1991

[54] ALUMINIUM BATTERIES

[75] Inventor: John A. Hunter, Banbury, England

[73] Assignee: Alcan International Limited, Montreal, Canada

[21] Appl. No.: 299,228

[22] Filed: Jan. 23, 1989

[30] Foreign Application Priority Data

Jan. 26, 1988 [GB] United Kingdom ............... 8801663

[51] Int. Cl.$^5$ ............................................. H01M 2/38
[52] U.S. Cl. ........................................ 429/51; 429/69; 429/206
[58] Field of Search ................................. 429/50–51, 429/67–70, 206

[56] References Cited

U.S. PATENT DOCUMENTS

| 3,880,671 | 4/1975 | Kordesch et al. | 429/206 X |
| 4,146,678 | 3/1979 | Anthony et al. | 429/50 |
| 4,814,240 | 3/1989 | Zaromb | 429/50 X |

FOREIGN PATENT DOCUMENTS 60-79673  5/1985  Japan .............................. 429/67

Primary Examiner—Stephen J. Kalafut
Attorney, Agent, or Firm—Cooper & Dunham

[57] ABSTRACT

The invention concerns batteries with aluminium alloy anodes, and generally aqueous alkaline electrolytes and cathodes. The anode in an alloy of Al with an activating element selected from Cd, Sn, Bi, Sb, In, Be, B, Se, Te, P, As, C, Re, Pd, Nb, Si and Zn. When the anode is polarized at a suitable electro-negative potential, typically from −1.8V to −2.3V relative to a Hg/HgO reference electrode, the anode operates in a new state, herein called a hyper-active state, in which the battery operates at a higher voltage and/or hydrogen gas is generated at a higher rate than in conventional aluminium batteries. The hyper-active state is maintained by control of anode potential (typically around −2.0V at a low current densities) and electrolyte hydrodynamics.

15 Claims, 25 Drawing Sheets

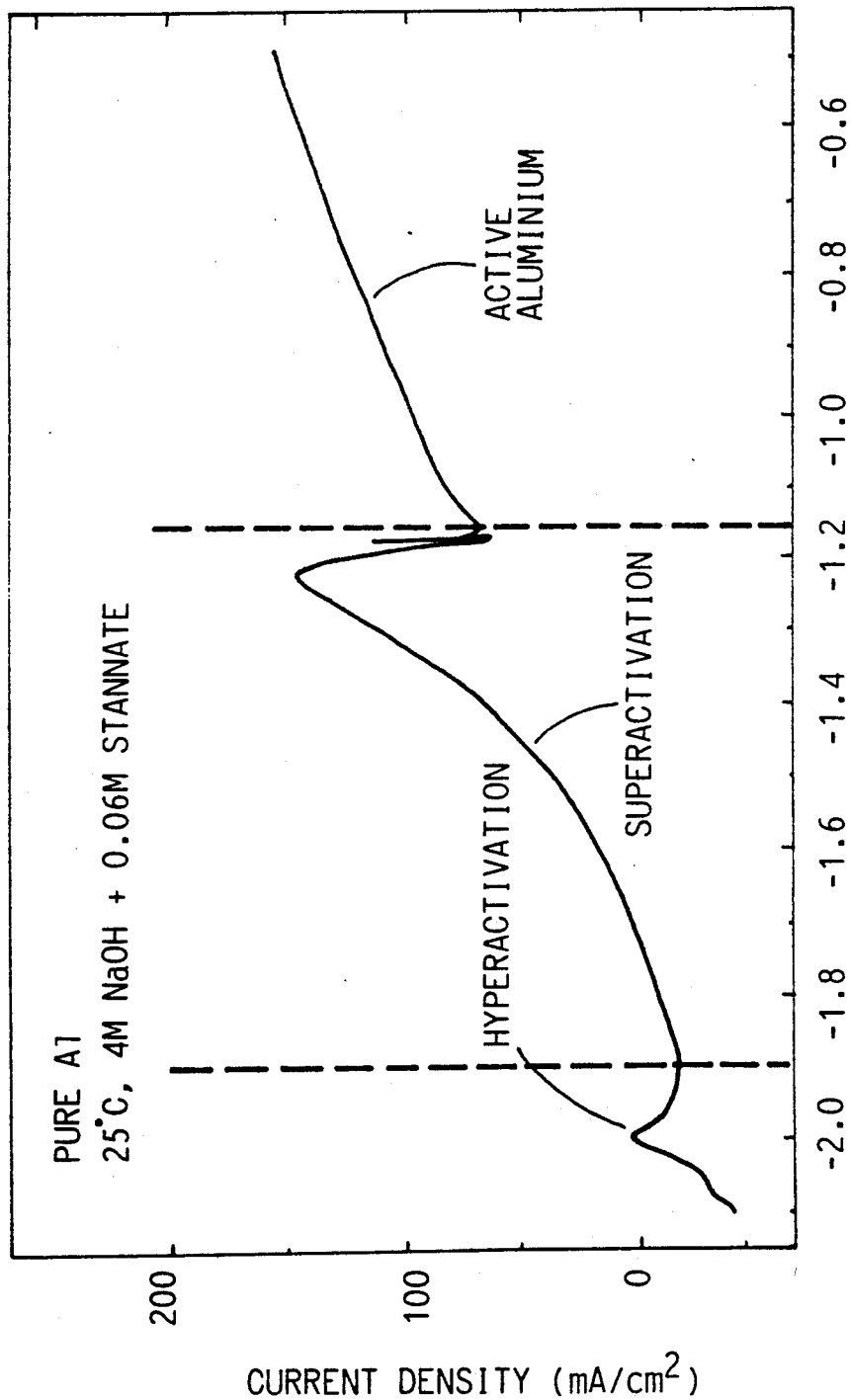

ALUMINIUM BATTERIES

This invention relates to batteries with aluminium anodes and to methods of operating such batteries at very high voltage. Aluminium batteries with alkaline electrolytes have greatly superior performance to those with neutral chloride electrolytes. In simple alkaline electrolytes, pure aluminium cannot be used as the anode, because it polarizes under load. It is accepted as necessary to use alloys of aluminium for the anode in such batteries. There is a considerable body of patent and other literature showing the use of Al alloys with activating elements such as Ga, In, Sn, and Tl.

In batteries of this kind, the aluminium anode can exist in various states, two of which we have called super-active and hyper-active. To the best of our knowledge, the hyper-active state, on which this invention is based, is entirely new.

The super-active state may be described as the natural condition in which aluminium anode alloys discharge in alkaline and neutral electrolytes. Anodes in this state are more electrochemically active than pure aluminium would be under the same reaction conditions. This is because the alloying additions break down the naturally occurring protective film by localized action (pitting). It can be observed that the surface of the anode becomes pitted, on a scale of a few tens of microns, with globules or agglomerations of activator metals at the bottoms of the pits. When in the super-active state, an aluminium alloy anode typically has an open circuit potential of around $-1.7$ V to $-1.85$ V (vs Hg/HgO in 25° C. 4M NaOH).

The hyper-active state was initially observed as a transient one at the start of anode dissolution, and a precursor to the super-active state. Anodes in the hyperactive state typically exhibit open circuit potentials of $-1.95$ V to $-2.15$ V (vs Hg/HgO in 4M NaOH at 25° C.). Hence the measured open circuit potential can be used to determine in which state the anode is operating.

Unless otherwise indicated herein, reference to electronegative potentials is in relation to the standard Hg/HgO electrode in 25° C. 4M NaOH. Adding 100 mV converts the figures to the standard $H_2$ scale. Subtracting 140 mV converts the figures to the standard calomel electrode (SCE) scale. Thus $-1.7$ V (Hg/HgO) = $-1.6$ V ($H_2$) = $-1.84$ V (SCE).

Reference is directed to the accompanying drawings, in which.

Each of FIGS. 5 to 10 is a graph of current density against potential obtained in rotating disk electrode potential sweep experiments.

Each of FIGS. 11 to 17 comprises one or more potential-pH equilibrium (Pourbaix) diagrams, specifically for:

11 (a)—Sn-$H_2O$
11 (b)—Al-$H_2O$
12 —Bi-$H_2O$: —Sb-$H_2O$
13 —In-$H_2O$
14 —Hg-$H_2O$
15 —Zn-$H_2O$ —Cd-$H_2O$
16 —P-$H_2O$; —Ge-$H_2O$; —Se-$H_2O$; —B-$H_2O$
17 —Si-$H_2O$ —C-$H_2O$

The Pourbaix diagrams of FIGS. 11 to 17 are all based on the standard hydrogen electrode as references.

Figure 1:
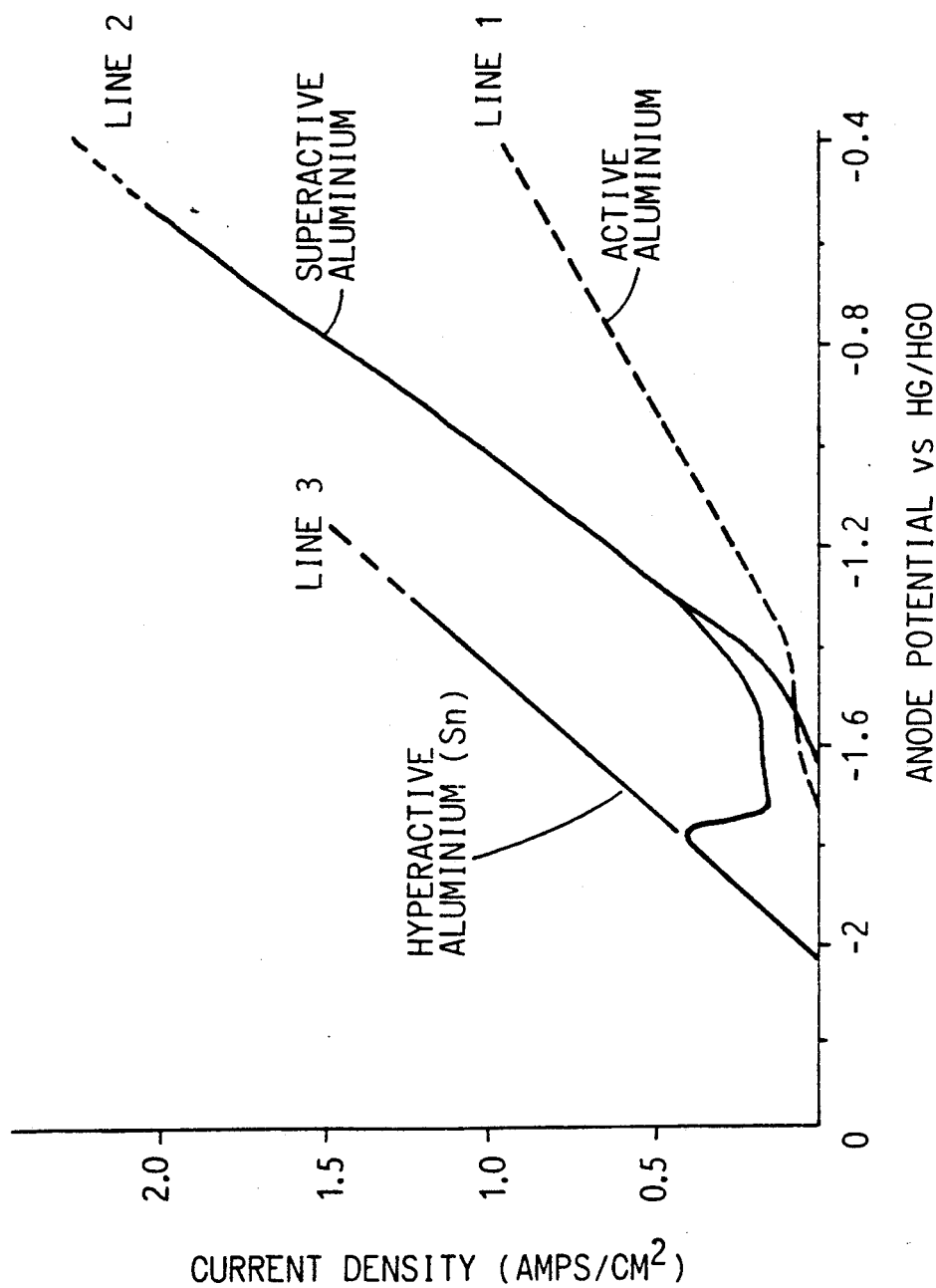
FIG. 1 is a graph of current density against anode potential, showing results obtained from rotating disk electrode potential sweep experiments using a tin binary anode in 4M NaOH at 60° C.

FIG. 1 shows the polarization characteristics of pure aluminium, line 1, and a 0.09 weight percent Sn binary alloy, line 2. The anode potential was scanned from $-2.1$ V to $-0.5$ V versus a Hg/HgO reference electrode and the current output monitored. The steeper slope of line 2 illustrates the reduced tendency to polarization which the tin addition affords to the binary alloy. This line is typical of super-activated aluminium anodes containing tin in solid solution. Further experiments have shown that this state is stable over prolonged periods of discharge, and is in fact the condition in which anodes used in existing commercially useful batteries are operated. It has been observed that the reaction surface of anodes in this super-active condition are characterized by the retention of the tin dopant metal in discrete globules which are associated with pits. It is now known that this condition only occurs in aluminium alloys containing dopant metals which are more noble than aluminium (i.e. have a more positive $M/M^{n+}$ reversible potential) and are lower melting point than aluminium. Ten such dopant elements have been identified—Hg, Ga, In, Sn, Bi, Tl, Pb, Zn, Cd and Sb.

Figure 2:
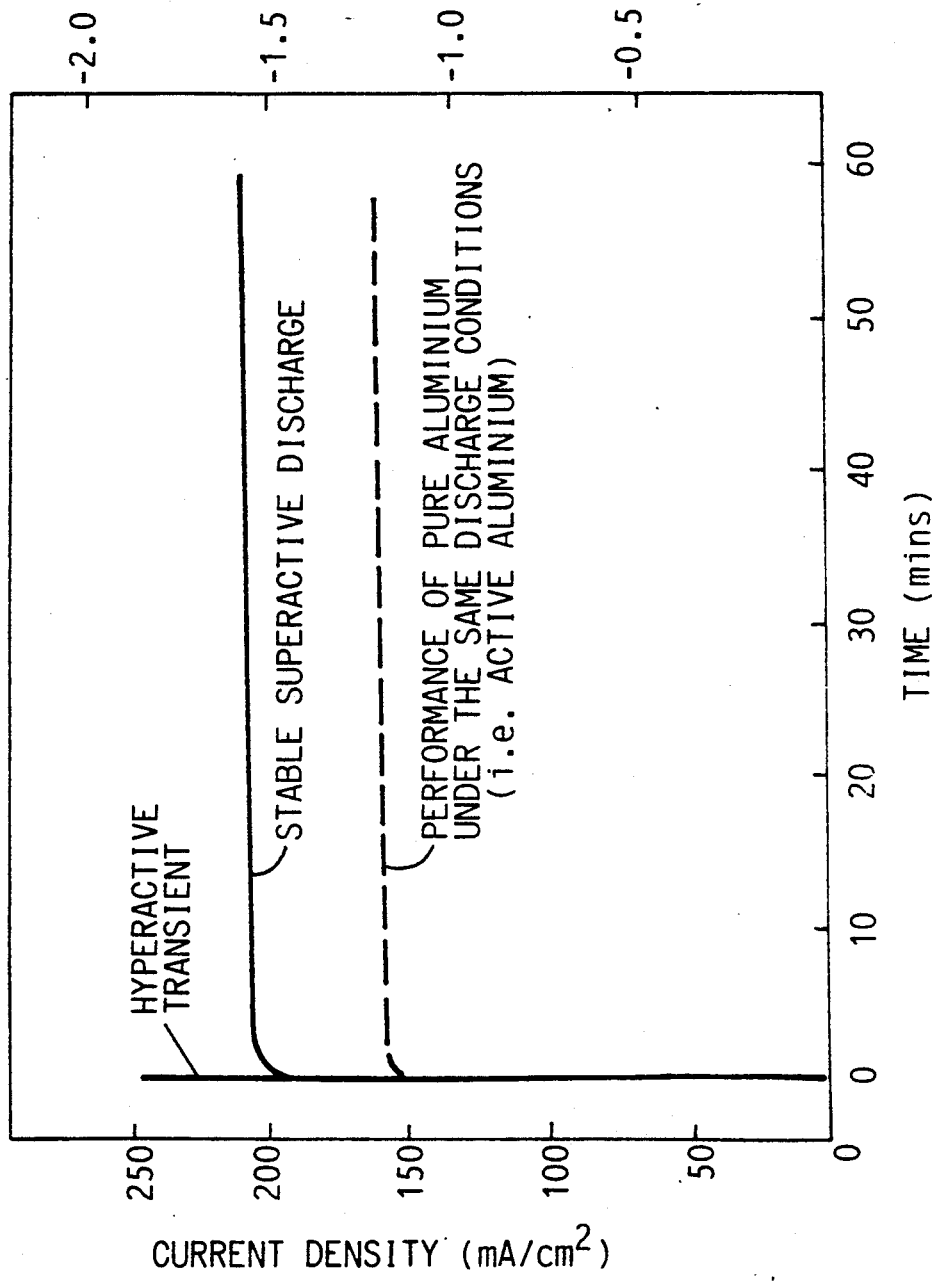
FIG. 2 is a graph of current density against time, showing the discharge characteristic of an Al-Sn-Ga alloy in 4M NaOH at 60° C. in an aluminium air cell.

During low current density discharge experiments (around 40 mA/cm$^2$) using anodes containing tin and/or indium a short lived transient in the current and voltage outputs has been observed by us. This occurs as a precursor to stable super-active discharge. FIG. 2 shows an example of this for an anode containing Sn and Ga. After one or two seconds (often much less time) the traces fall back to a stable output of significantly lower level than the transient peak. This is the super-active condition and is the normal stable electrochemical condition under which the aluminium alloy anodes are discharged. The transient stage at the outset of discharge is the hyper-active state. This invention results from the discovery that it is possible to stabilize the hyper-active state.

The hyper-active state was first observed by us during potentio-static rotating disk electrode experiments performed on a 0.02 weight percent Sn binary anode in 60° C. 4M NaOH. The novel polarization characteristics of this alloy are shown in FIG. 1 line 3, for comparison with conventional alloys. In the early part of the experiment the alloy follows a completely different polarization line from the more concentrated tin alloy (0.09 weight percent Sn, line 2). Although the slope of this hyper-active line is approximately the same as the super-active line, it lies at a much more negative position on the potential axis. As the experiment progressed the hyper-active condition eventually degraded and the anode reverted to the super-active state. This type of polarization behaviour had not previously been observed.

It is immediately apparent from this result that anodes in the hyper-active condition offer the possibility of far higher voltages than even the best super-active anodes available to date.

In one aspect, this invention provides a battery comprising an aluminium anode, an aqueous electrolyte and a cathode, wherein at least one of the electrolyte and the anode contains at least one hyper-activating element in a concentration allowing the anode to be brought to a hyper-active state, the battery comprising also means for polarizing the anode to a potential of $-1.8$ V or more negative in the presence of the electrolyte, and means for maintaining rapid relative movement between the anode and the electrolyte.

In another aspect, the invention provides a battery comprising an Al anode, an aqueous electrolyte and a cathode, wherein at least one of the electrolyte and the anode contains at least one hyper-activating element at a concentration allowing the anode to be brought to a hyper-active state, the at least one hyper-activating element having the property of being reduced at a first electronegative potential to a species which does not accumulate at the anode surface, the $Al/Al^{3+}$ reversible potential constituting a second electronegative potential more electronegative than the first, and means for bringing the anode to a chosen electronegative potential intermediate the said first and second potentials, the anode and the electrolyte being substantially free of elements which are thermodynamically stable in metallic form at the chosen potential. The invention also includes methods of operating these batteries by polarizing the anode in the presence of the electrolyte to an electronegative potential to bring the anode to the hyper-active state.

In order to bring the anode to the hyper-active state and stabilize it in that state, four key features are involved: the composition of the anode; the composition of the electrolyte; the electrolyte hydrodynamics; and the electrochemical conditioning. These will be described in turn.

1. ALLOY COMPOSITION

At least one of the electrolyte and the anode contains at least one hyper-activating element in a concentration allowing the anode to be brought to a hyper-active state. Preferred hyper-activating elements for this purpose are Cd, Sn, Bi, Sb, In, Ge, B, Se, Te, P, As, C, Re, Pd, Nb, Si and Zn. Optimum concentrations vary, but are likely to be in the range 0.005% to 1.0% by weight; there may be an upper limit of hyper-activator element, above which it is not possible to bring the anode into a hyper-active state.

In order to contribute to the process of hyper-activation it is thought that the hyper-activating element must be present either in aluminium solid solution or dissolved in the electrolyte. Although second phase particles are not thought to induce hyper-activation it is not thought that they interfere with the process.

In binary alloys with Al, Sn is preferably present at a concentration of from 0.01% to 0.5% by weight. Outside this range, it may be difficult or impossible to bring a binary Al-Sn anode to a hyper-active state. For various reasons discussed in more detail below, the optimum concentration of Sn in Al-Sn binary alloys for this purpose is around 0.02% in solid solution. Sn is soluble in Al only to an extent of about 0.12% by weight. It should be noted that the hyper-active state is not dependent on having the Sn exclusively in solution, but is observed in binary alloys containing Sn both above and below this solubility limit. We have also observed the hyper-active condition in pure Al anodes plated with tin.

Figure 11A:
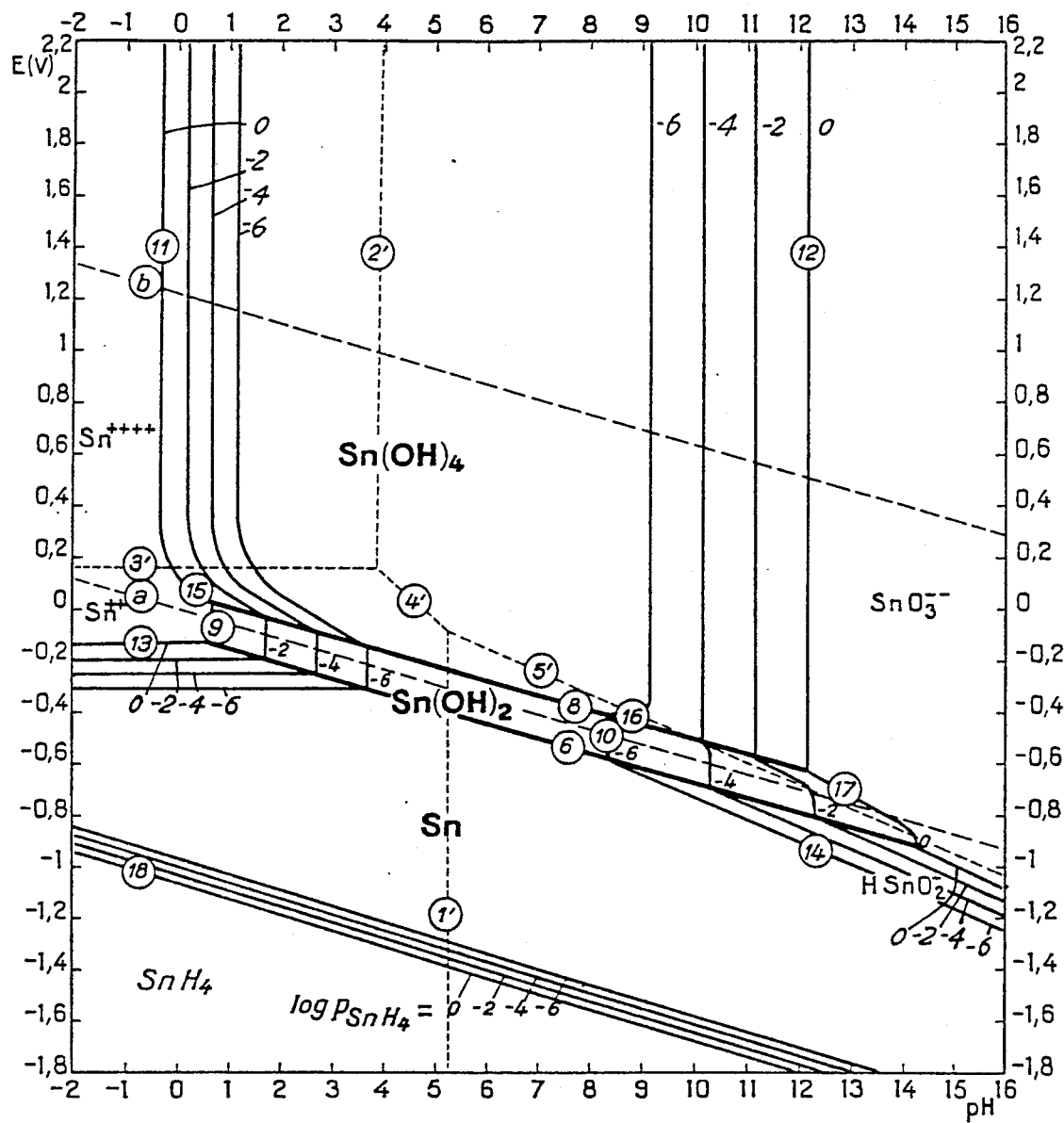
Figure 11B:
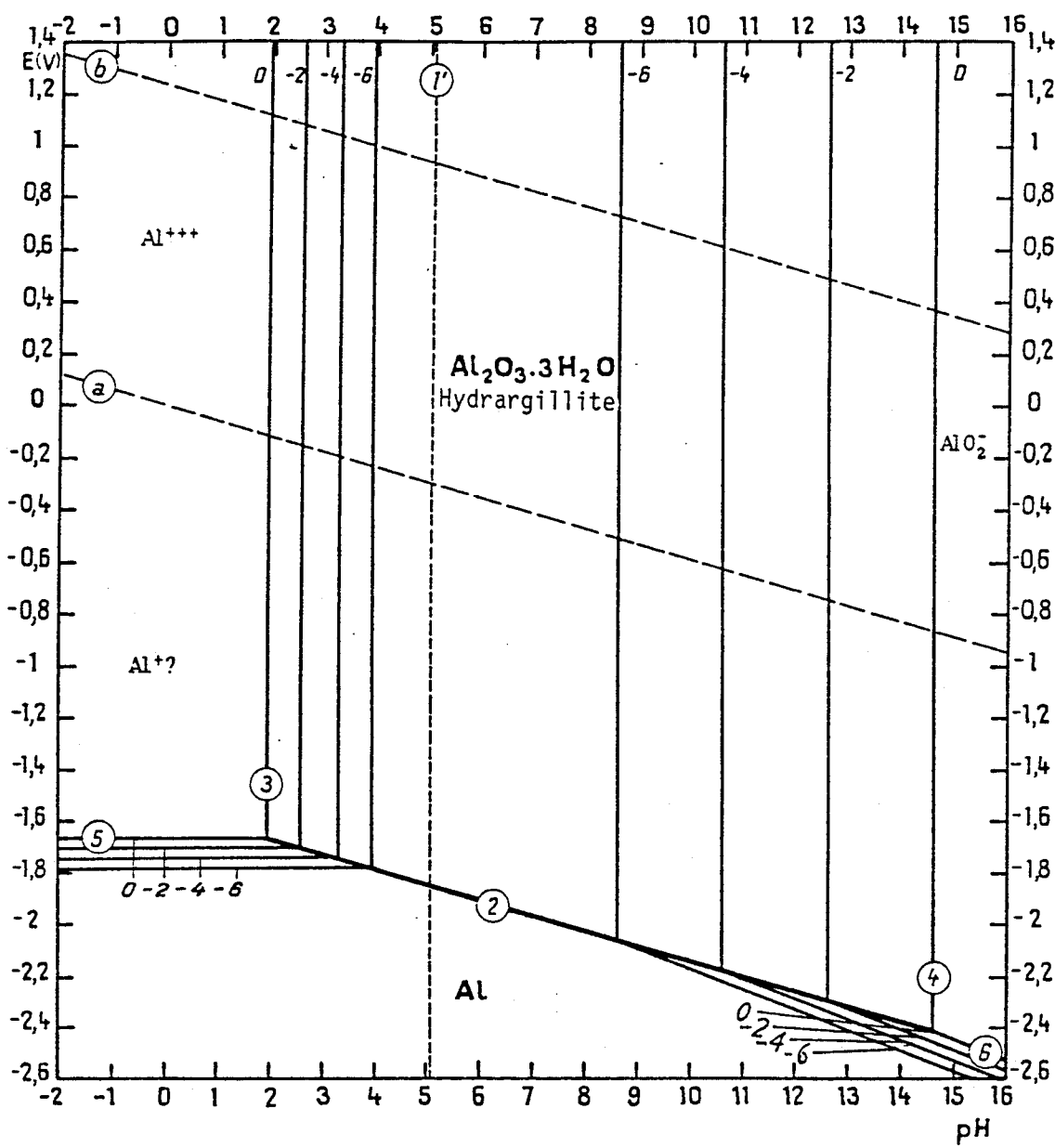

FIG. 11 shows the potential—pH equilibrium (Pourbaix) diagrams for (a), the $Sn-H_2O$ and (b) the $Al-H_2O$ systems. These diagrams show the regimes of thermodynamic stability of different electrochemical species. In the experiments illustrated in FIG. 1 the anodes were polarized along a vertical line on these diagrams at pH of $\sim 14.5$. The super-active range observed in FIG. 1 (line 1) between $-1.0$ and $-1.8$ V corresponds with the regime in FIG. 11 (a) over which tin metal is electrochemically stable, and can therefore be retained on a reaction surface while, as can be seen from FIG. 11 (b) aluminium dissolution is occurring. At potentials less electronegative than $\sim -1.0$ V tin (and aluminium) will dissolve and therefore no retention of tin metal on the reaction surface is possible. This corresponds to the active regime of FIG. 1 (line 1) i.e. identical to the behaviour of unalloyed, pure aluminium. Examination of the pH-potential equilibrium diagrams for the nine other "superactivating" elements reveals that the super-active range also corresponds to the regime of stability of the metal species, at potentials less electronegative the aluminium reversible potential of $\sim -2.3$ V (relative to a standard $H_2$ electrode).

Figure 12A:
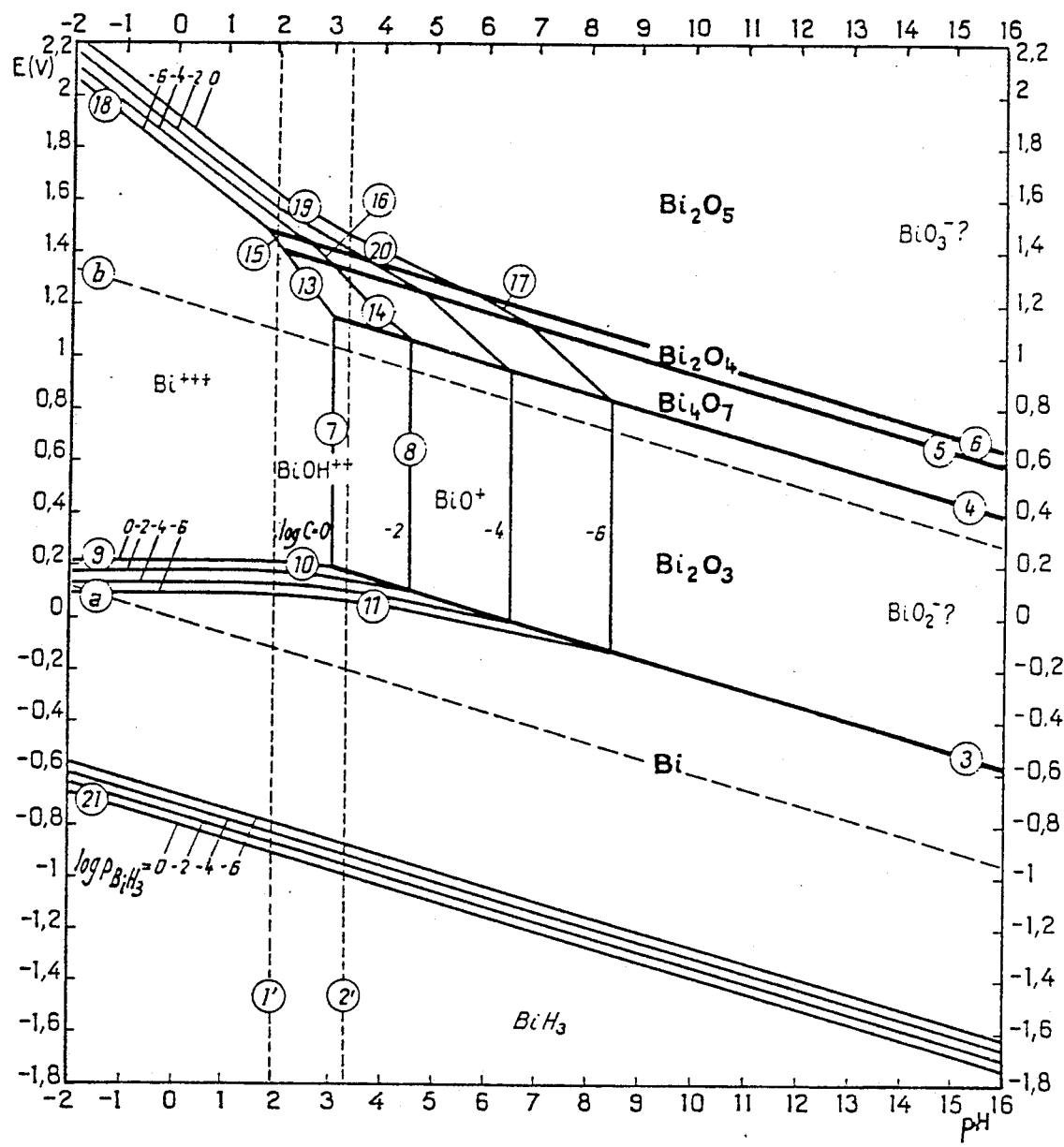
Figure 12B:
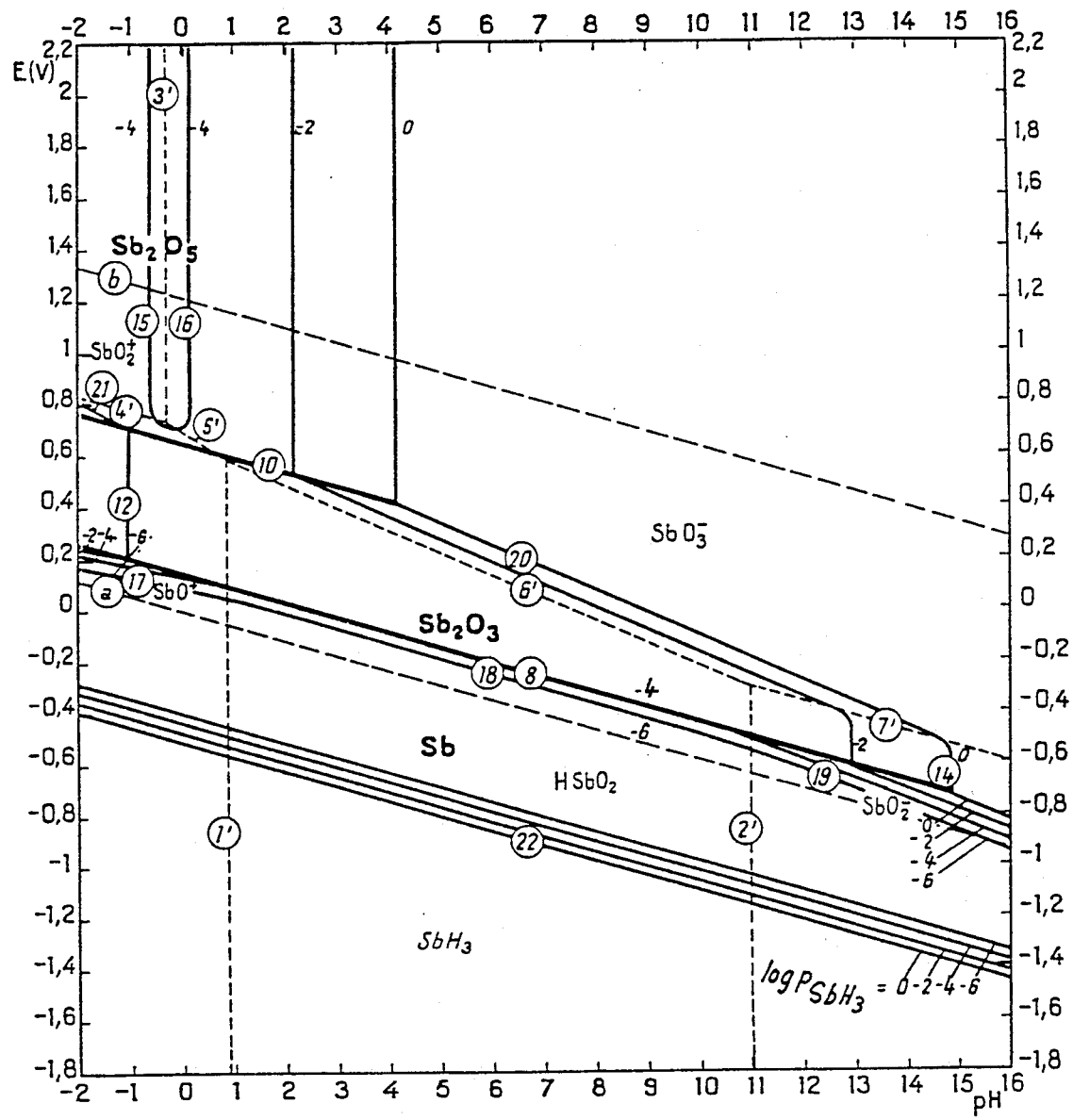

Further examination of these Pourbaix diagrams reveals the existence of metal hydride species for some of the elements at potentials more negative than the regime of stability of the metal. Only three, Sn, Bi and Sb show such a hydride at potentials less negative than the aluminium $M/M^+$ reversible potential of $\sim -2.3$ V. Two of these are shown in FIG. 12. It is, therefore, likely that aluminium anodes containing these elements would, in the most negative part of experiments such as those performed in FIG. 1 release the dopant metal atoms onto the reaction surface and these would react to form a metal hydride. It is also important to note that all of these hydride species are gases at room temperature, and it is therefore likely that no accumulation of released species would occur during this period (in the case of superactivation metal continues to build up during prolonged discharge).

It is believed that a hyper-activating element, in order to be capable of bringing Al to a hyper-active state, must have the property of being reduced at a first electronegative potential to a species (the fugitive species) which does not accumulate at the anode surface. For example, the species may be gaseous such as a hydride, or soluble such as a negative ion such that retention and accumulation of the activating species is impossible. Furthermore, the regime of stability of this species must extend to potentials which are less electronegative than the $Al/Al^{3+}$ reversible potential (the second electronegative potential). In a typical alkaline electrolyte at pH about 14.5, this second electronegative potential is about $-2.3$ V (relative to a standard $H_2$ electrode). As the diagrams in FIGS. 11 and 12 show, Sn, Bi and Sb fulfil these requirements by forming gaseous hydrides, and indeed each is capable of bringing Al into the hyper-active state (potential sweep experiments, see FIG. 8 for Bi and FIG. 10 for Sb.). In a similar way, Se forms a negative ion $Se^{2-}$ at potentials less electronegative than $-2.3$ V (see FIG. 9 for Se).

Figure 13:
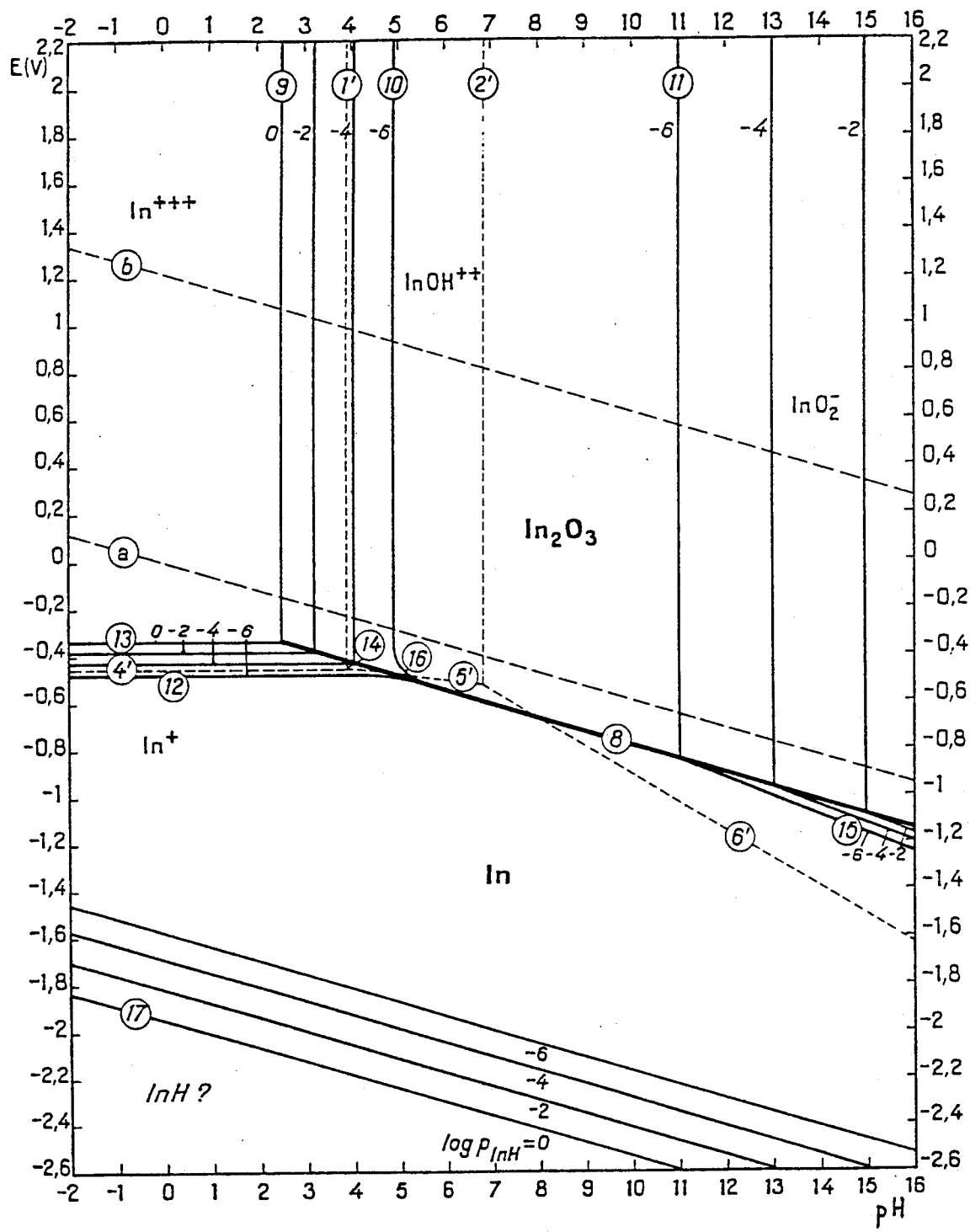
Figure 14:
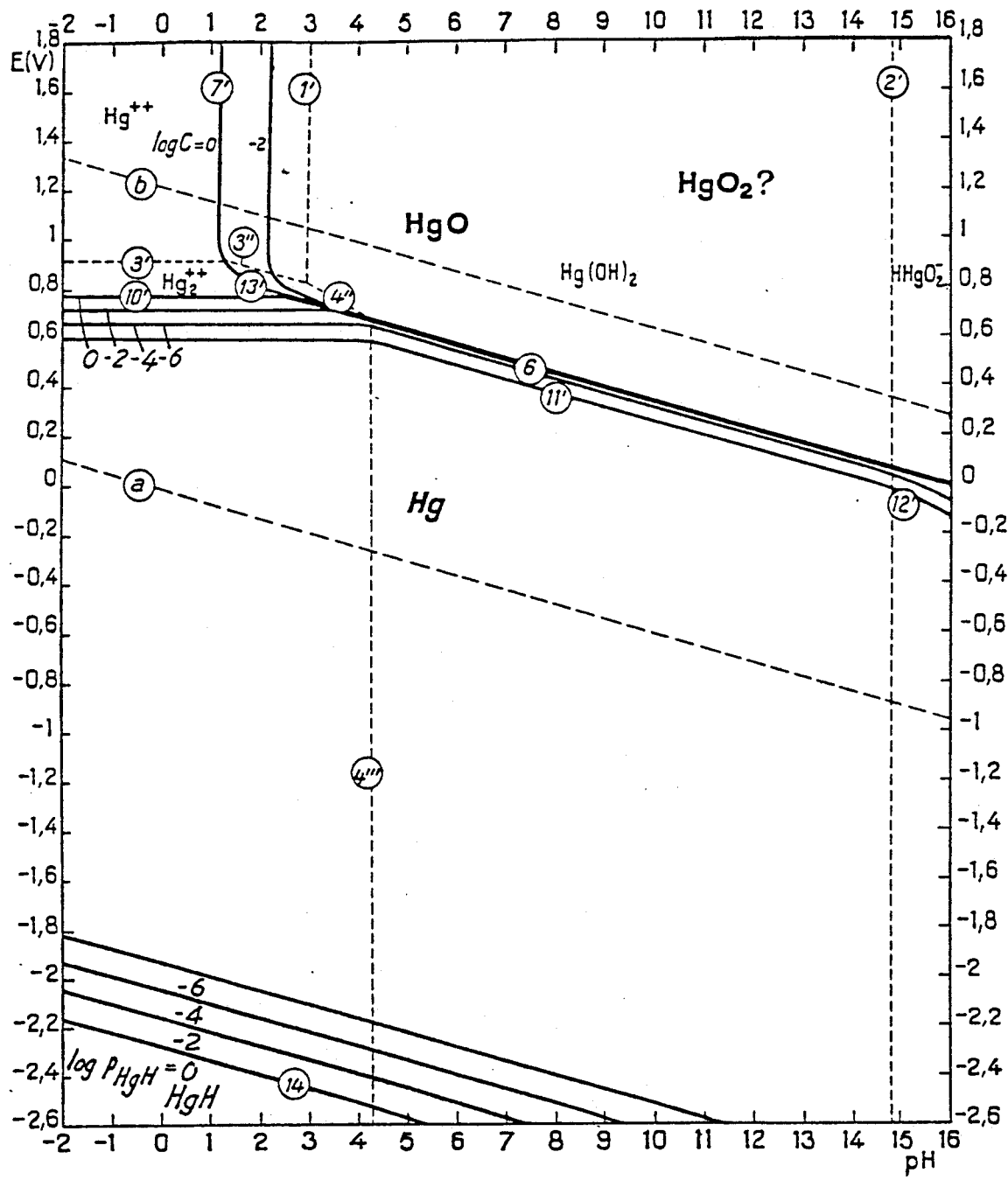

Indium, however, also shows a hyper-active state, although it is extremely short-lived and as can be seen from FIG. 13 should not form a hydride or soluble ion in the defined potential regime. It is just possible however, that at the extremely low concentrations of indium needed to observe the hyper-active state a hydride could form briefly if its partial pressure were low enough. In a similar way, lead and thallium have been shown to be capable of generating transient hyperactive states in Al anodes.

Figure 8A:
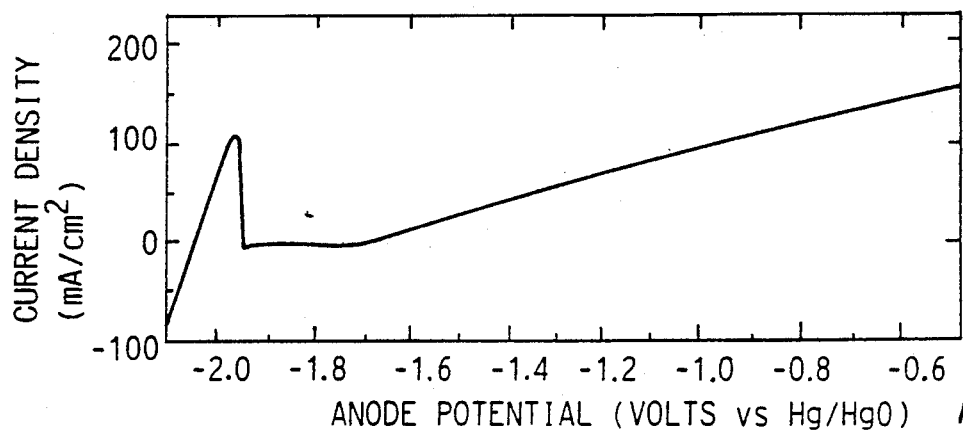
Figure 8B:
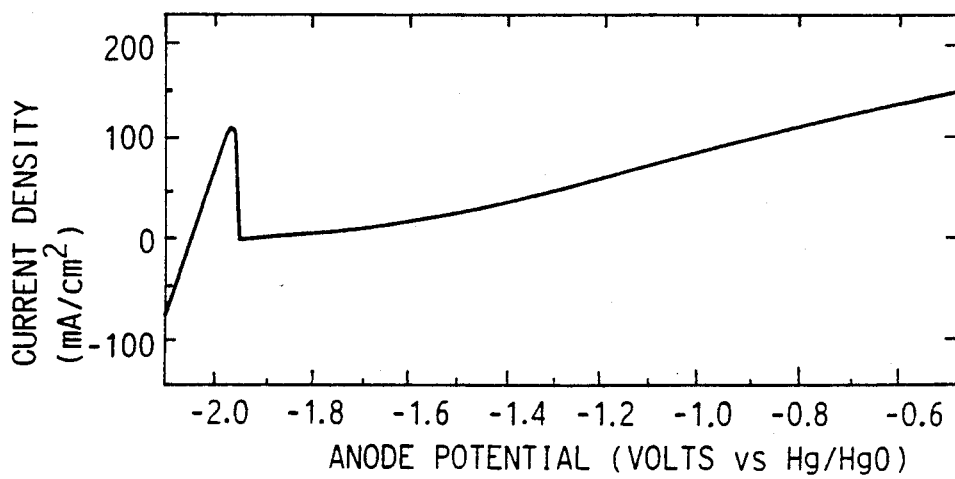
Figure 8C:
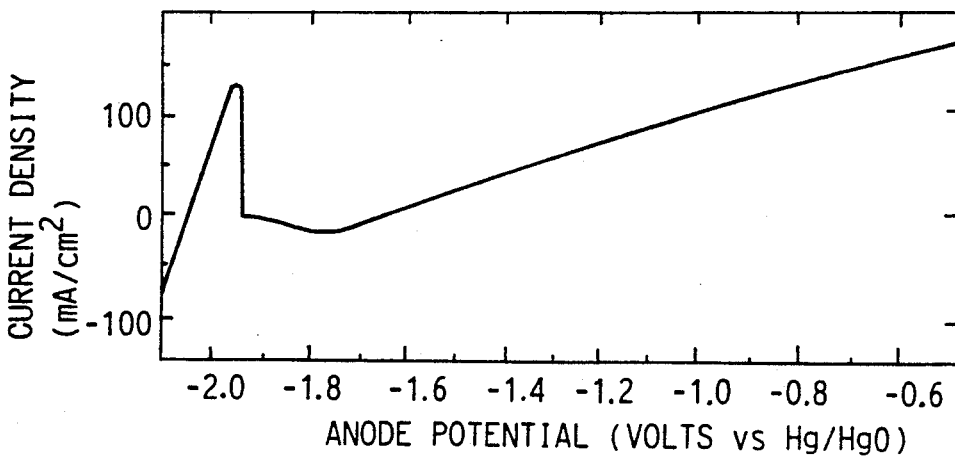
Figure 9A:
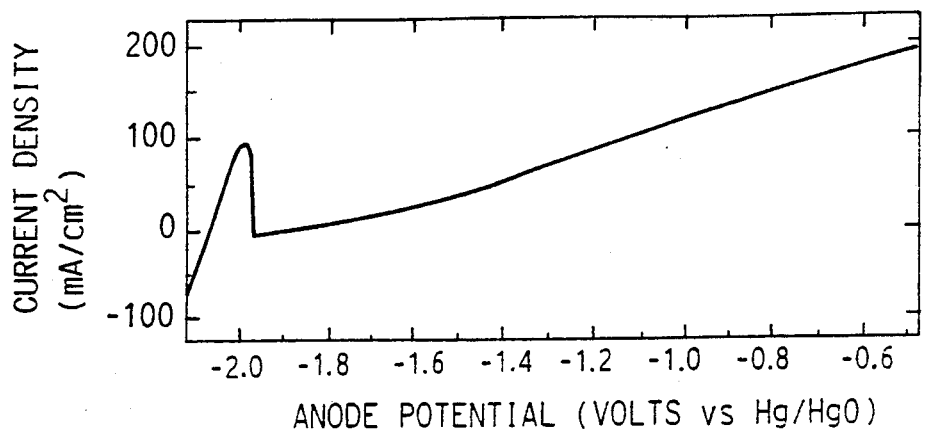
Figure 9B:
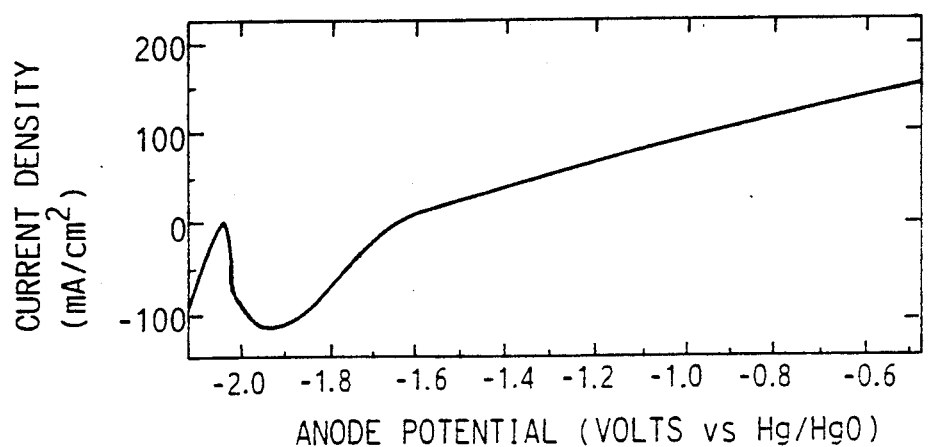
Figure 9C:
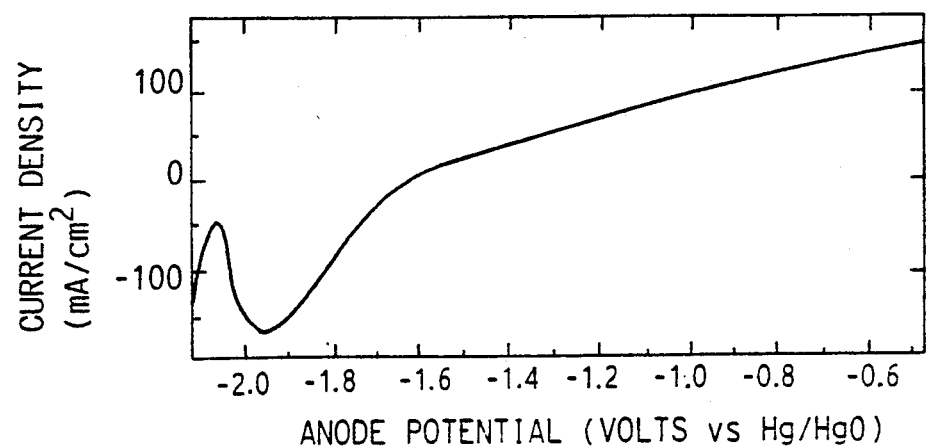
Figure 9D:
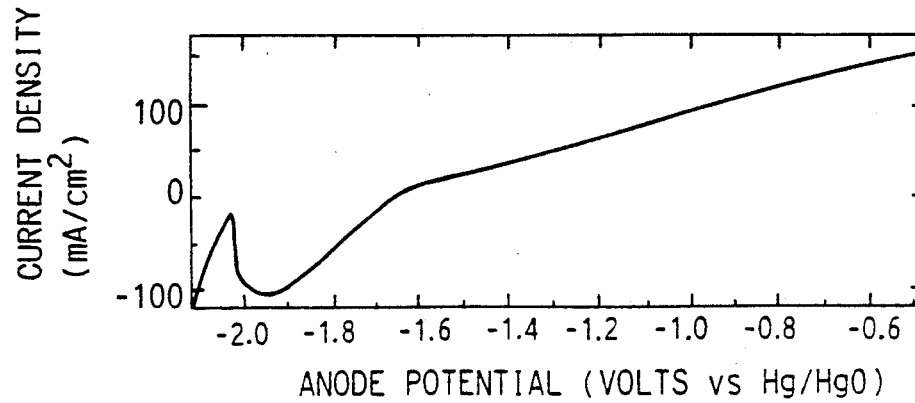
Figure 15A:
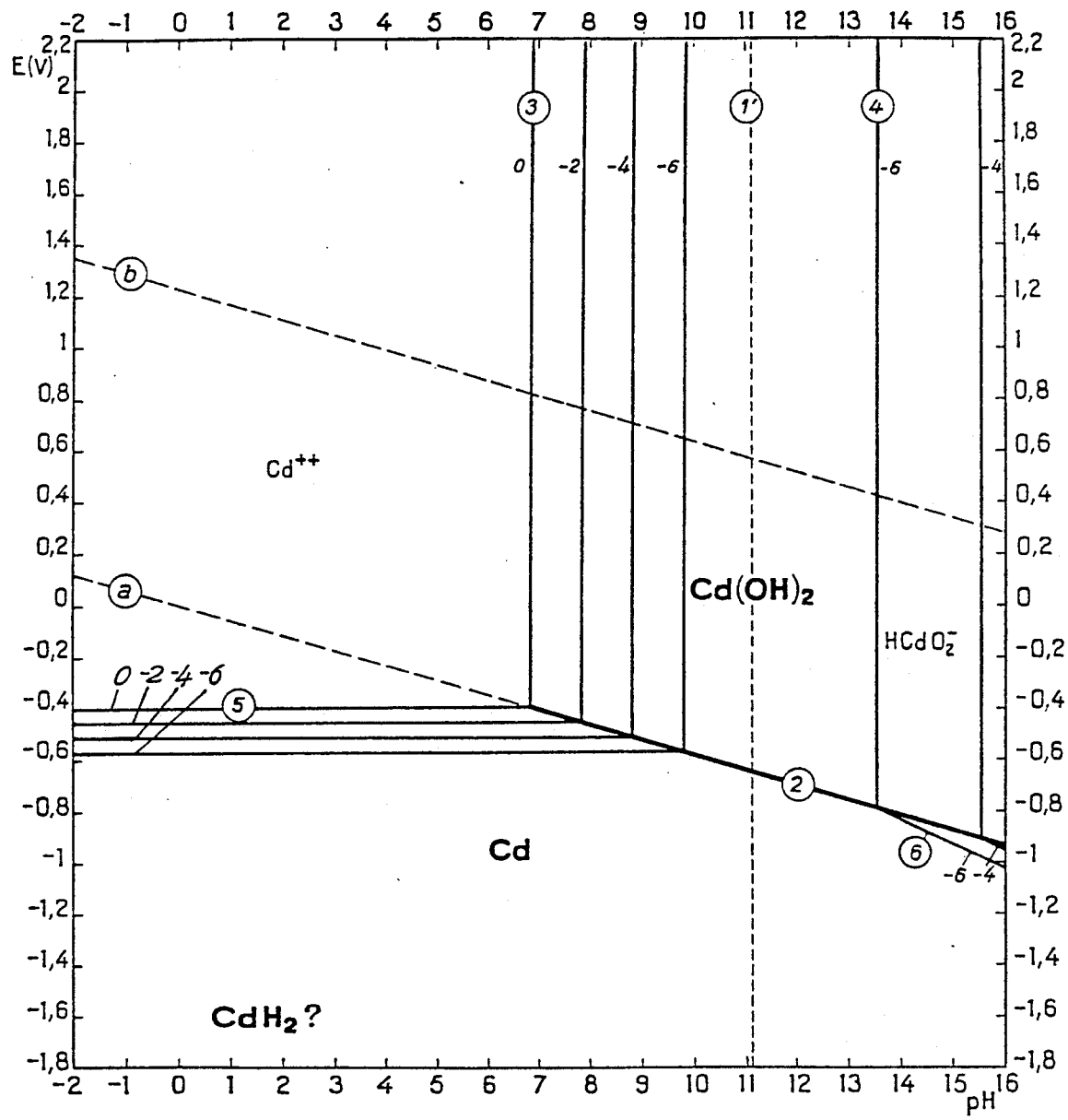
Figure 15B:
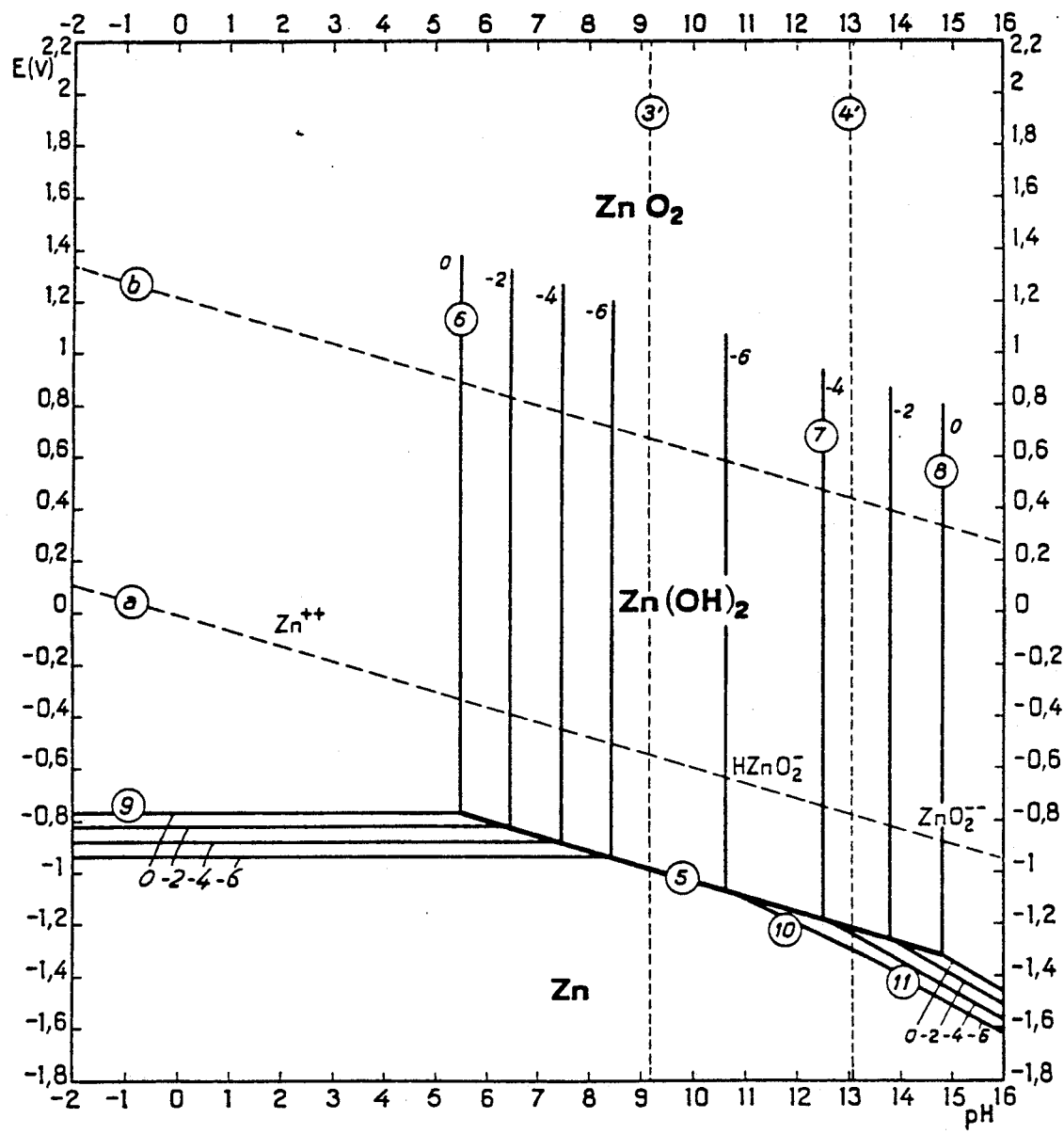
Figure 16A:
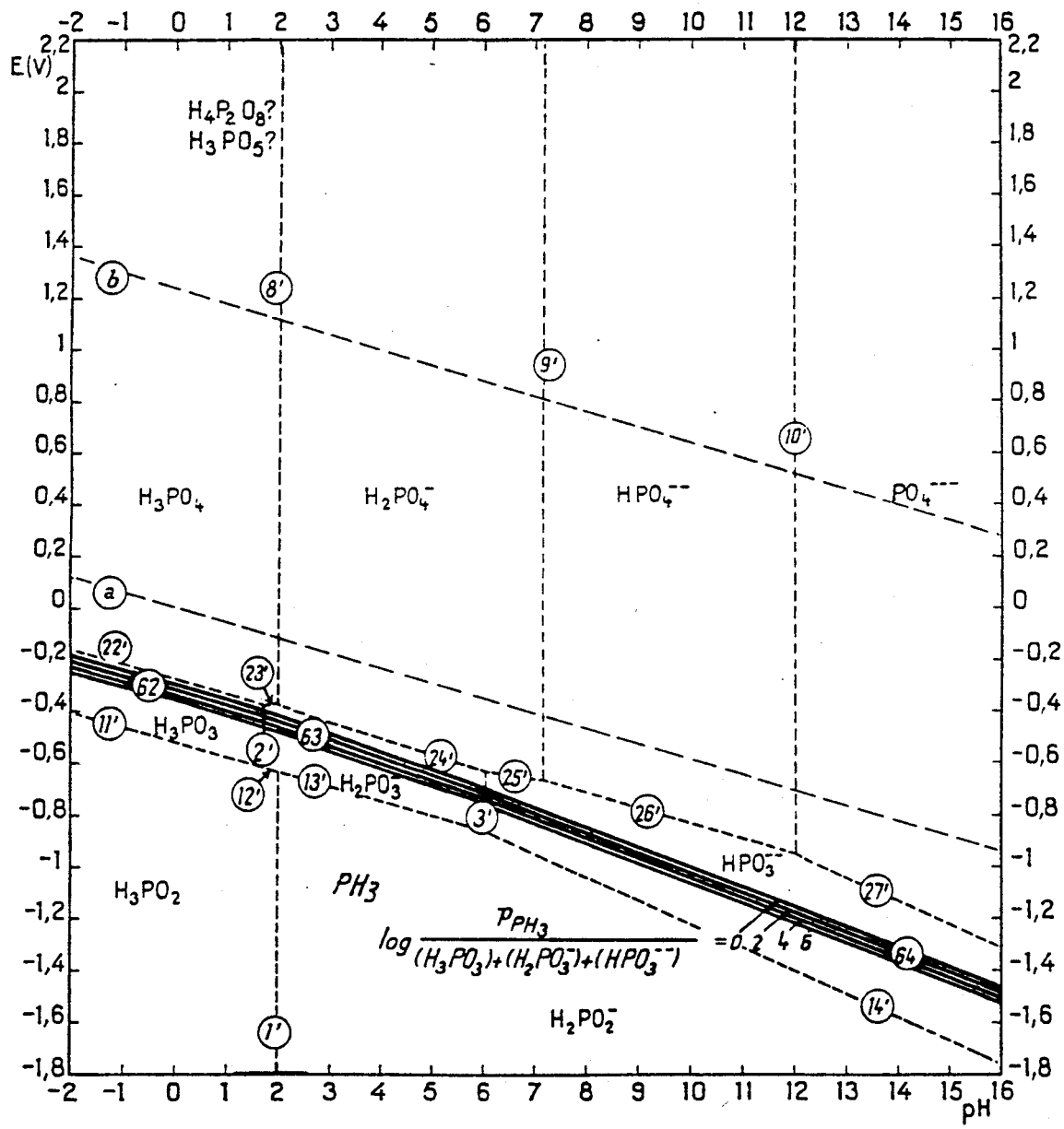
Figure 16B:
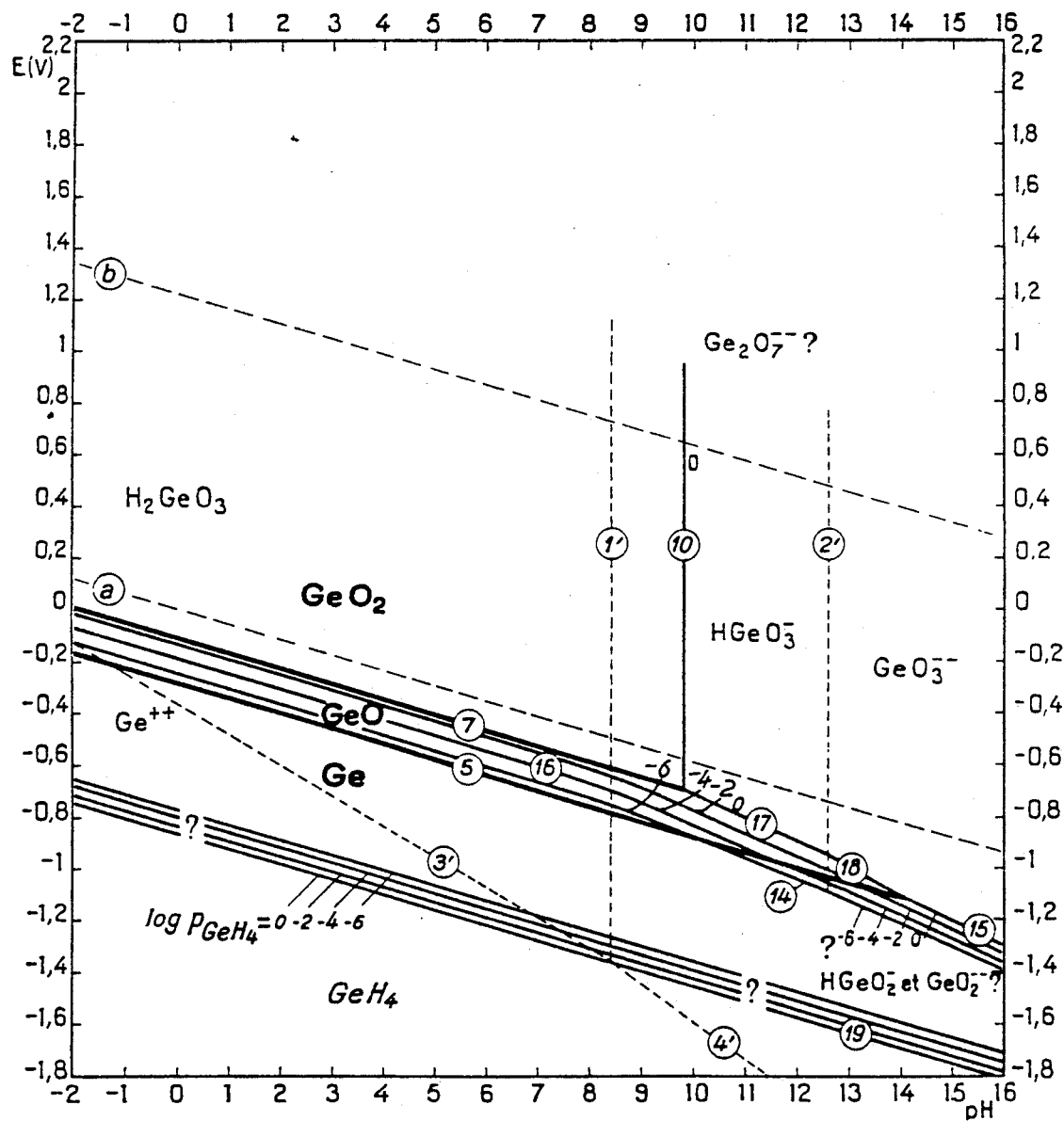
Figure 16C:
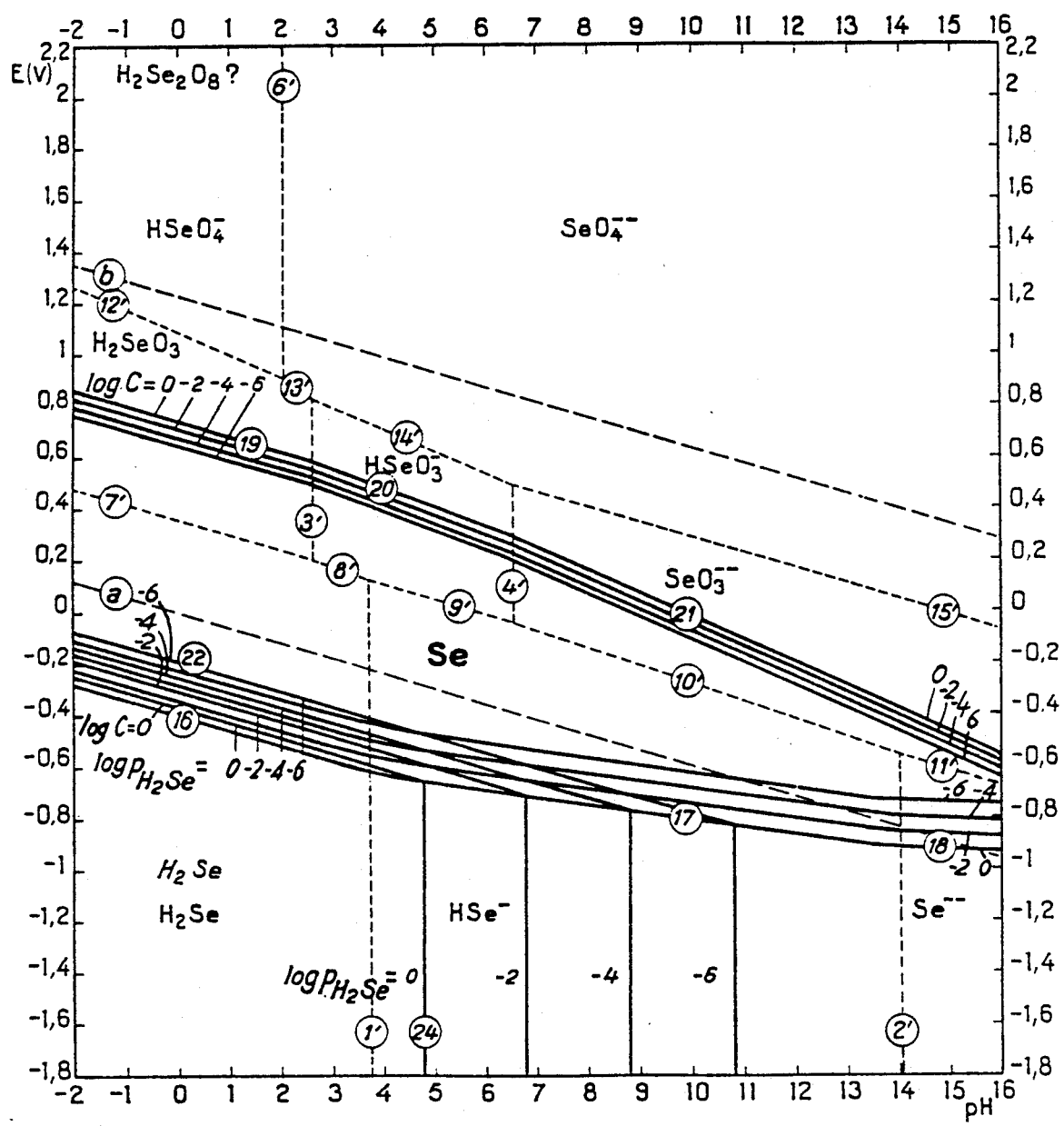
Figure 16D:
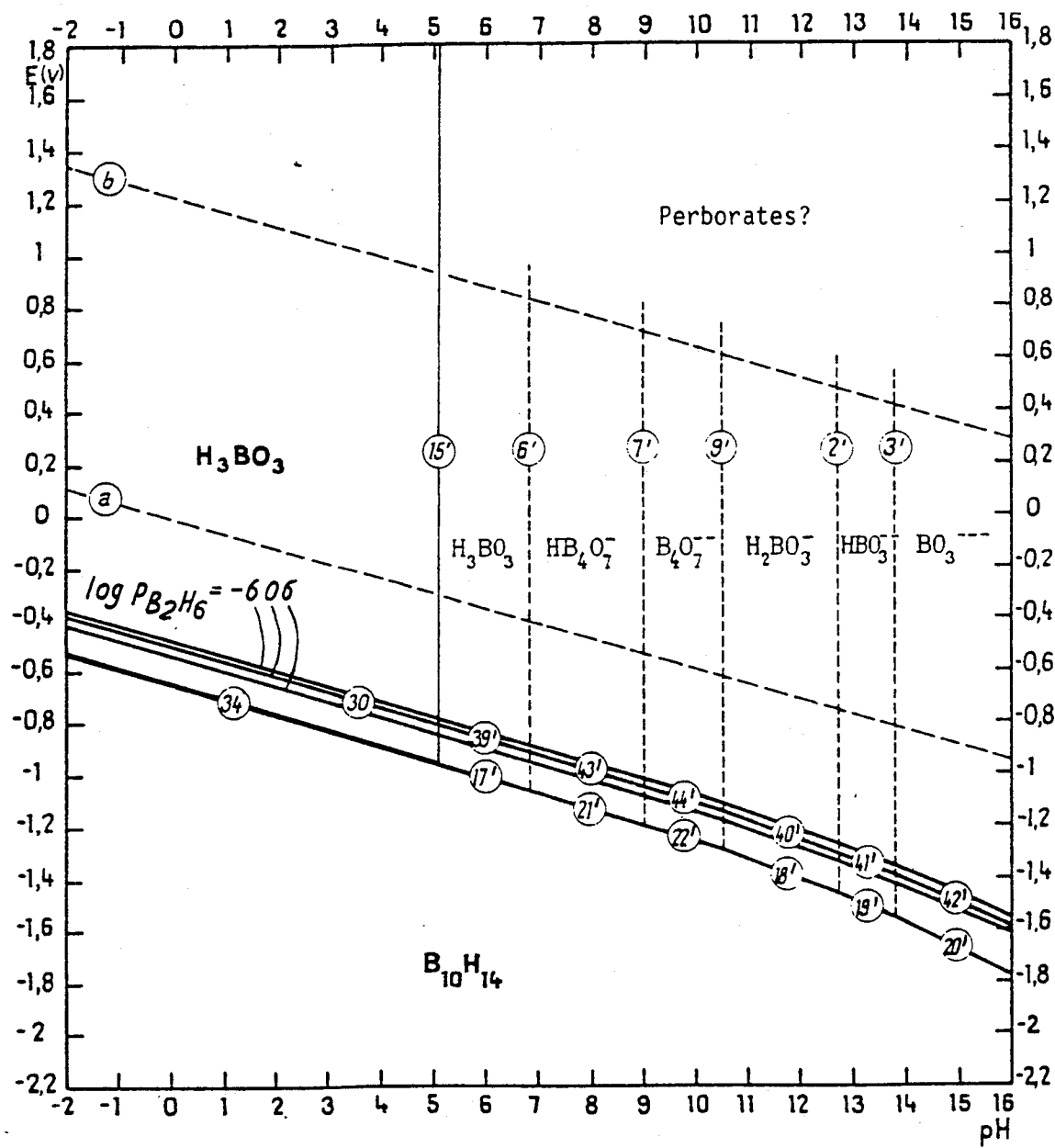

Cadmium forms a gaseous hydride, and has been shown to be a hyperactivator of Al (see FIG. 8). Zinc may similarly form a gaseous hydride and has also been shown to be a hyperactivator of Al (see FIG. 8). The published Pourbaix diagrams for Cd and Zn are shown in FIG. 15 but are considered to be incomplete. Mercury on the other hand (see FIG. 14) is not a hyperactivator, although it is capable of bringing Al into a superactive state.

Figure 17A:
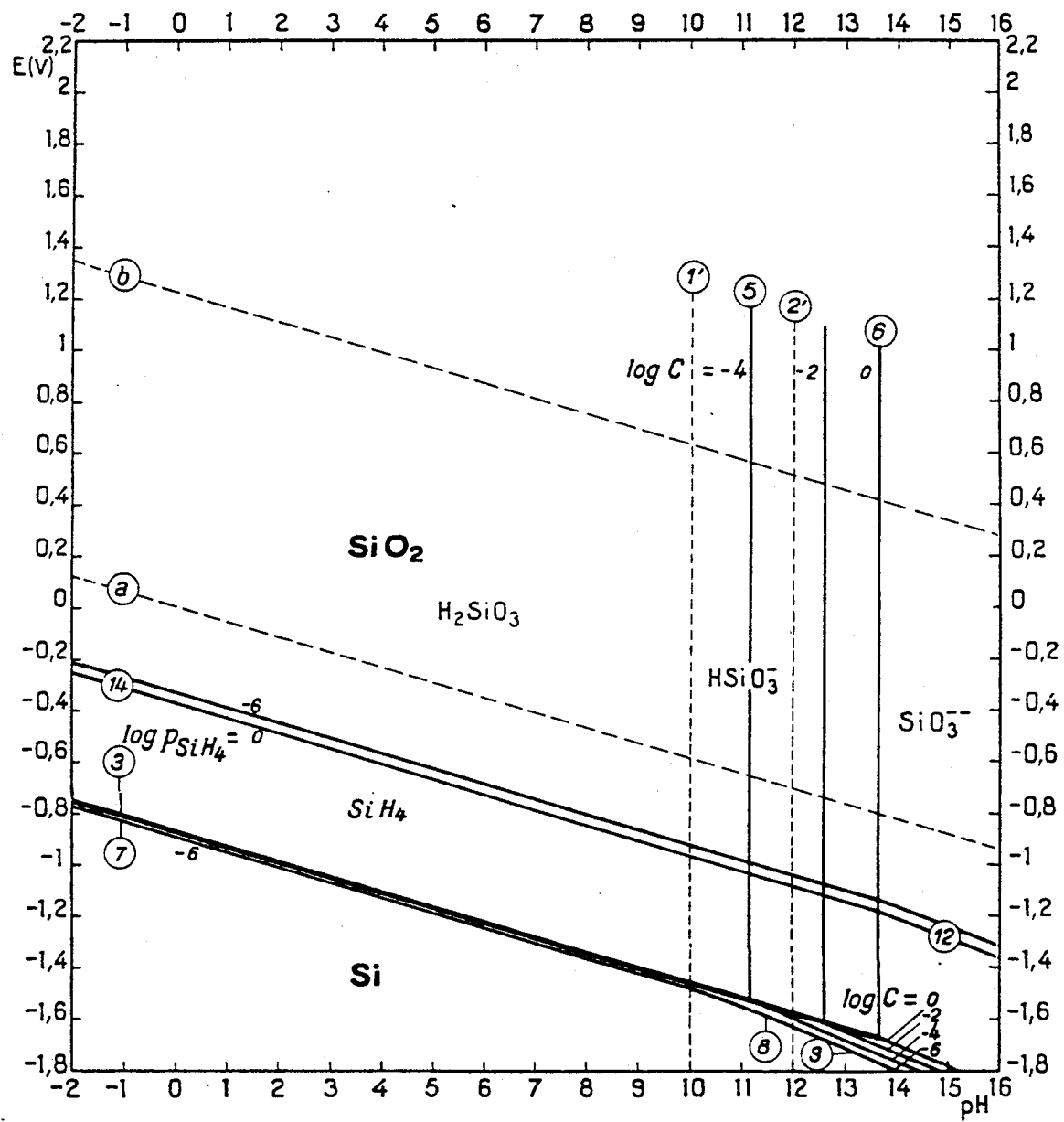
Figure 17B:
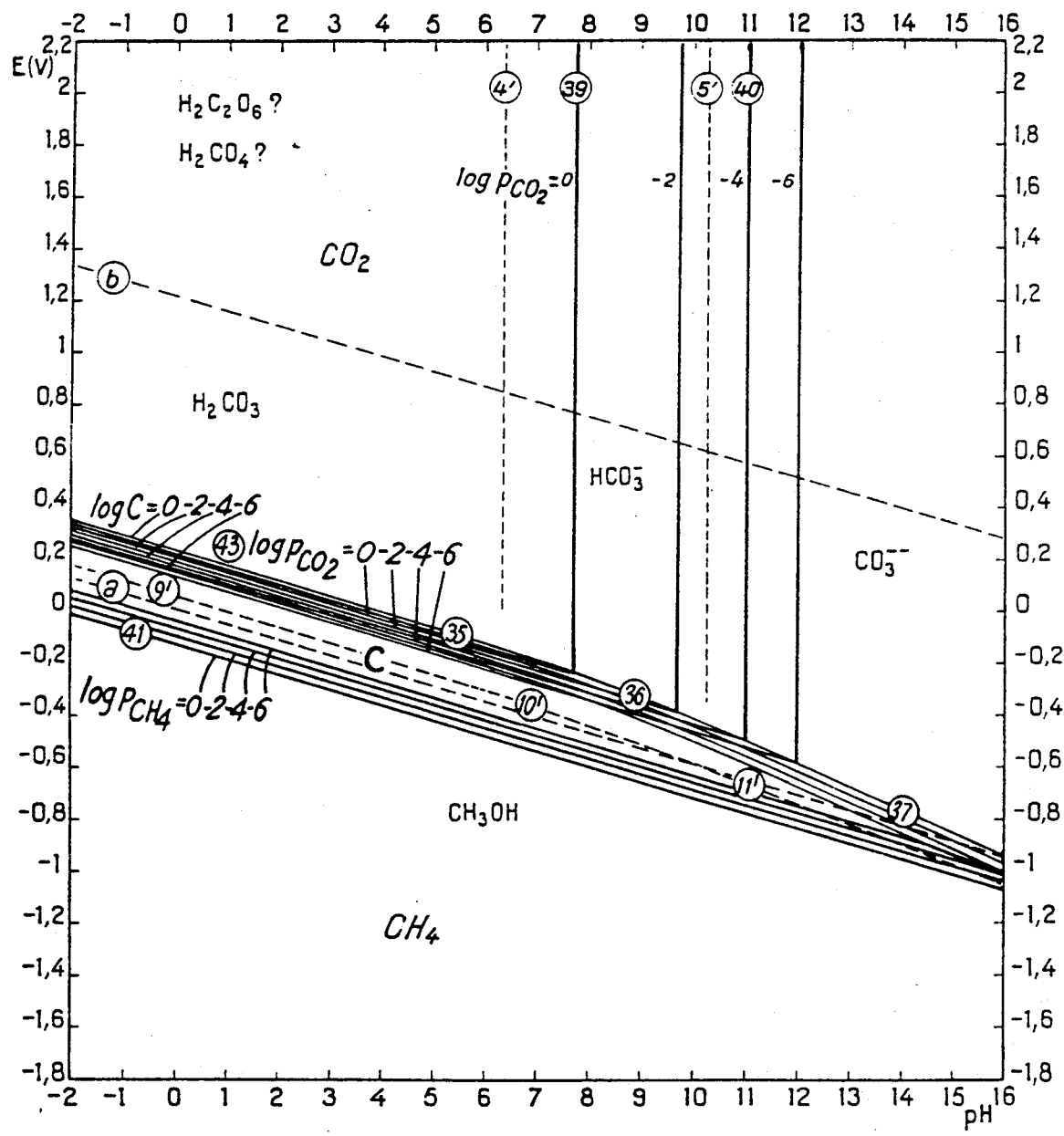

Elements which are not superactivators of aluminium can still afford hyper-active properties to aluminium. Elements such as Ge which has a higher melting point than aluminium, are hyperactivators since they form gaseous products at potentials less negative than $\sim -2.3$ V (relative to a standard $H_2$ electrode. FIG. 16 shows its Pourbaix diagram; a much larger group of elements are possible hyperactivators, including higher melting point elements such as B, Se, Te, P, Ge As, C, Re, Pd, Nb, Si. FIG. 9 demonstrates the effect for four of these, P, Ge, Se and B (see FIG. 16 for Pourbaix diagrams). The Pourbaix diagrams of Si and C are shown in FIG. 17.

The activating element may be present either in solution in the electrolyte or in the anode itself. Preferred activating elements are capable of existing in solid solution in Al (i.e. not as second phase particles) and without forming compounds with Al. Of the elements listed in the previous paragraph, Se, Te and particularly As, Ge and P, are preferred.

The conditions therefore required to bring the anode to a hyperactive state and maintain it in that state concern: the nature and concentration of the activator; the electrolyte hydrodynamics; the electrolyte pH; and the electronegative potential of the anode; and are different for different activator elements.

It is also necessary that the anode and the electrolyte should be substantially free of elements which are thermodynamically stable in metallic form at the chosen potential. If present to any significant degree, such elements rapidly accumulate on the anode surface which is believed to prevent the fugitive species postulated above from acting to hyper-activate the anode. Examples of such undesirable elements are Ga, Hg, In, Tl and Pb. In general, a stable hyper-active state is not possible in the presence of any metal more noble than Al that is itself not a hyper-activator of Al. These should be substantially absent in the sense that they are not deliberately added to the anode alloy or to the electrolyte, and are not present in either at a concentration greater than 0.05% preferably 0.005%.

The Al anode should be of at least commercial purity, preferably 99.99% purity or greater.

2. ELECTROLYTE COMPOSITION

The electrolyte is preferably alkaline, having a pH of at least 10 and preferably at least 12. A preferred electrolyte is 4M NaOH. Other possible electrolytes are 7M KOH, and 25% (5.3M) KOH or (5.9M) NaOH together with 3.5% by weight NaCl which may be provided from sea water.

In the same way that Al is known to be capable of existing in the super-active state in any electrolyte pH, it should also be noted that it is in principle possible to bring Al to a hyper-active state in a neutral saline or acid electrolyte. As judged from the Pourbaix diagrams, shifting the pH of the electrolyte may merely alter to a minor extent the first and second electronegative potentials. Once the anode has been brought to a hyper-active state in an alkaline electrolyte, it is possible that the battery might thereafter be operated in the presence of saline solutions such as sea water.

The electrolyte may contain one or more hyper-activator elements such as Cd, Sb, Zn, Sn or Bi. There may be a critical concentration in solution below which the hyper-activator element is not capable of bringing an Al anode to a hyper-active state. For some activator elements, it may be difficult or impossible to achieve solution in alkaline electrolytes at the concentrations required. We have been able to bring a pure aluminium anode to a hyper-active state in alkaline electrolyte containing either Sn, Sb or Bi.

3. ELECTROLYTE HYDRODYNAMICS

As originally observed by us, the hyper-active state was a transient phase lasting at most a few seconds. In order to stabilize the hyper-active state, circulation of the electrolyte is required but the extent of such circulation may vary depending on other parameters particularly anode composition. It is preferred that there be rapid, and perhaps turbulent, flow of electrolyte past the surface of the anode.

4. ELECTROCHEMICAL CONDITIONING

In order to bring the anode to a hyper-active state, it needs to be polarized in the presence of the electrolyte at a suitable negative potential, often about $-1.8$ V or more negative. This negative potential is expressed, as are all others in this specification, relative to a standard Hg/HgO electrode. The desired negative potential can be achieved simply by contacting the anode with the electrolyte at open circuit, although it is also possible to artificially polarize the anode to a still more negative potential. Upon contact with the electrolyte, the open circuit potential of the anode typically changes, from an initial value more positive than $-1.8$ V to a value more negative than $-1.8$ V and which may be as negative as $-2.1$ V. At this stage, the anode is in a hyper-active state. Unless special action is taken, the open circuit voltage changes further, and settles typically at a value in the range $-1.7$ V to $-1.85$ V, in which the anode is in the super-active state. All this may take, depending on various factors such as anode composition, electrolyte composition and temperature, between 1 or 2 seconds and several minutes. In order to stabilize the hyper-active state, the electrolyte hydrodynamics have to be controlled during this time, e.g. by switching on a pump to promote rapid flow of electrolyte past the anode at the time the two are brought into contact.

There is a critical potential, often $-1.8$ V or more negative, which must be achieved if the anode is to become hyper-active. If significant current is drawn from the battery at the outset, this may prevent achievement of the required negative potential. Therefore, current should not be drawn from the battery until the anode has been brought to the hyper-active state. There may be provided means for starting to draw current from the battery only when that potential is e.g. $-1.8$ V or more negative. These means may operate e.g. by sensing the potential of the anode, or at a specific interval after contact between the anode and the electrolyte.

The critical electronegative potential required to bring Al into the hyperactive state (the first electronegative potential as defined above) may vary depending on the nature of the activating element. The following table lists these critical potentials for several elements relative to a standard Hg/HgO electrode. The potentials quoted are for equilibrium conditions at pH 14. In practice a significant overpotential, i.e. potentials more negative than those quoted, may be required to induce the transformation.

| Element | | Potential (V) |
|---|---|---|
| Sb | | −1.4 |
| P | | −1.5 |
| Bi | | −1.6 |
| Ge | | −1.7 |
| Si | | −1.8 |
| B | | −1.8 |
| Pb | } The hyper-active state can exist only as a transient. | −2.3 |
| Tl | | −2.4 |
| In | | −2.5 |

The negative potential described above is a necessary but not always a sufficient condition for bringing the anode into a hyper-active state. If the anode was previously operated in the super-active mode, then it may need to be de-activated by being polarized to a more positive potential. This may conveniently be done by providing a short circuit between anode and cathode, or the anode may be brought to a zero or low negative potential (e.g. −1.0 V or more positive) in some other way. This action is thought to passivate the agglomeration of activation elements on the surface of an anode in the super-active state and to allow the hyper-activation affect to dominate on re-starting the cell from open circuit.

In some cases, the anode may be incapable of reaching the super-active state. For example, this appears to be true with a binary alloy of Al with 0.02% Sb, or with an Al anode in an electrolyte containing an activating element such as Bi in solution (tested at 25° C.). In these cases, no preliminary de-activation step is required, and the anode can be simply and reversibly brought into the hyper-active state.

The nature of the cathode is not critical to the invention, in the sense that it does not directly affect the hyper-active state of the anode. Air cathodes can be used, or manganese dioxide cathodes or cathodes based on silver oxide. If it is desired to maximize power output from the battery, the cathode area should generally be at least as great as the anode area.

Electrolyte temperature is not critical, and is conveniently ambient, although higher temperature up to 100° C. may be used. Elevated temperatures may affect the preliminary operations of bringing the anode to a hyper-active state, and more particularly of de-activating a previously super-active anode. Electrolyte hydrodynamics may be controlled by standard means, such as for example pumping the electrolyte through a stationary cell, or causing the anode to spin within the cell, or by a combination of such means.

At the very high voltages involved, the anode is rather rapidly dissolved away, ordinarily giving the battery a relatively short life. Battery life can be extended by providing a continuous anode in coiled wire, rod or sheet form, which can be uncoiled and fed into the presence of the electrolyte during operation of the battery. Because of the rapid dissolution of the anode, the anode/cathode gap, and hence the internal resistance and other cell parameters, alter quite rapidly during operation of the battery. Means need to be provided for maintaining the electrolyte separate from the anode until the battery is to be switched on, and perhaps also for separating the two whenever the battery is switched off. But the invention is of particular importance for batteries that are intended to run continuously once they have been switched on.

At low current densities, hyper-active anodes operate at potentials of about −2.0 V. Under these conditions the naturally occurring hydrogen evolution reaction is extremely vigorous. As more current is drawn from these anodes the hydrogen evolution rate is progressively reduced. At 40 mA/cm$^2$ the hydrogen evolution rate is about 15 cm$^3$/cm$^2$/min at 400 mA/cm$^2$ this rate is reduced to about 7 cm$^3$/cm$^2$/min.

By varying the current drain and electrolyte flow characteristics, it is possible to build a controllable hydrogen generator based on aluminium rods or wires fed continuously into a cell provided with an air cathode. Enough electrical energy should be generated in these cells to power the anode movement and the electrolyte flow.

The only consumables in such a system are the aluminium anode, oxygen from the atmosphere, and water from the electrolyte. A particular advantage of this method of hydrogen generation is that no oxygen is evolved during the reaction. (In the electrolysis of water, the most common method of generating hydrogen, oxygen is generated at one electrode and hydrogen at the other, and the risk of explosion is always present.)

In the following experimental section, the four critical features of the invention are discussed in turn with reference to FIGS. 3 to 7 of the accompanying drawings. This in turn is followed by some details of the experiments used to generate the graphs.

EXAMPLE 1 ALLOY COMPOSITION

Figure 3:
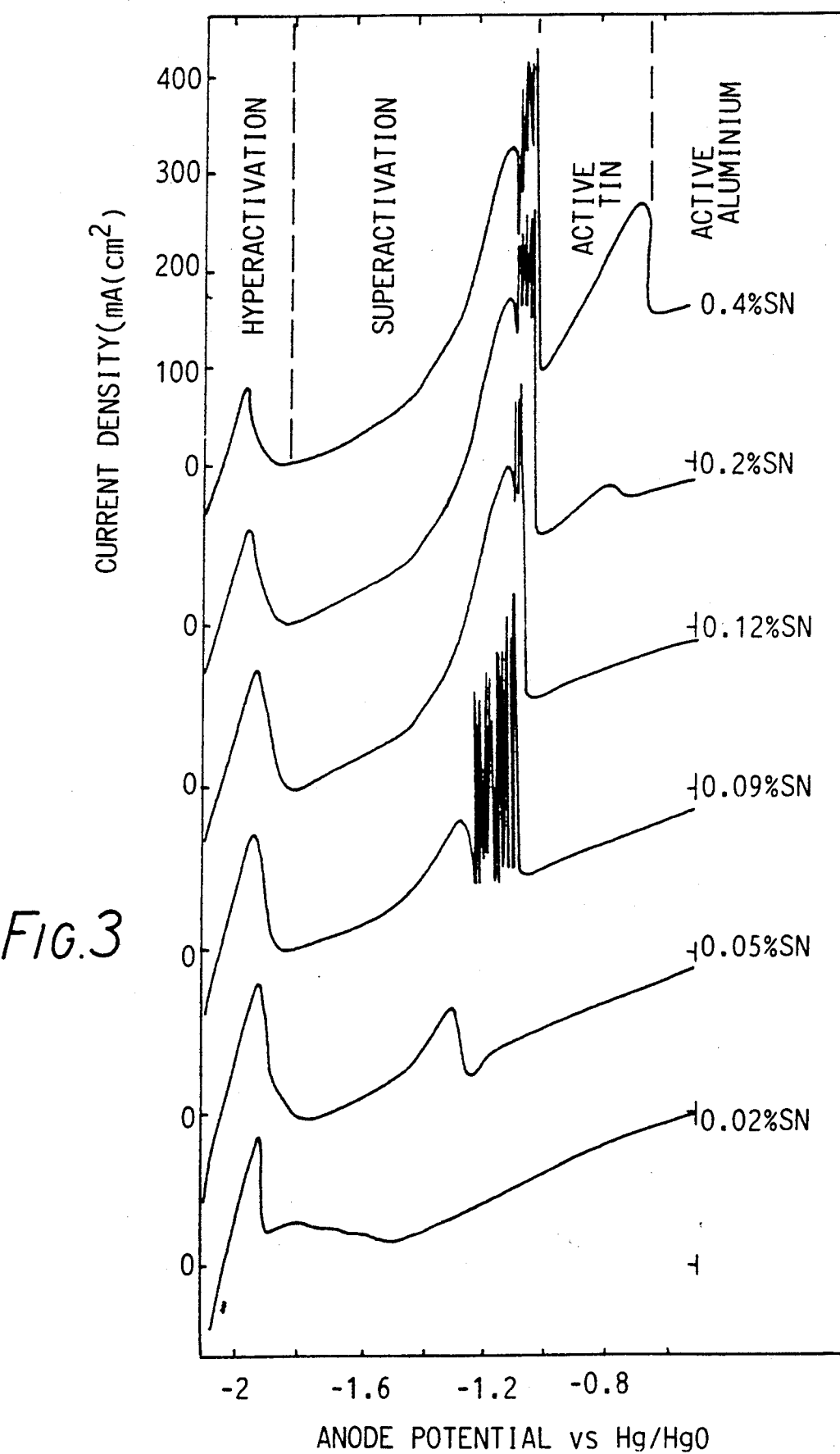
FIG. 3 shows a number of traces of current density against anode potential, obtained in rotating disk electrode potential sweep experiments using tin binary anodes in 4M NaOH at 25° C.

FIG. 3 shows polarization diagrams for six tin binary alloys ranging in composition from 0.02% Sn to 0.4% Sn. It can be seen from this diagram that the alloys move through a series of up to four electrochemical conditions during polarization between −2.1 V and −0.5 V (vs Hg/HgO reference electrodes). These are:
1. Hyperactivation
2. Superactivation
3. Active tin dissolution
4. Active aluminium dissolution.

These conditions, which are seen as peaks on the six curves are labelled on FIG. 3 for the 0.4 wt % Sn binary alloy.

Condition 3 occurs in only the 0.2% Sn and 0.4% Sn and results from the dissolution of second phase tin particles which exist only in these two alloys. Conditions 1, 2 and 4 occur in varying degrees for all the binary alloys tested.

The hyperactive peak, condition 1, grows as the alloy tin level falls from 0.4 to 0.02 wt %. Conversely, the super-active peak, condition 2, grows with increasing alloy tin level. Condition 4, active aluminium dissolution, is extended as the superactive condition is reduced.

It is clear from these results that the potential range over which the hyper-active condition operates is enchanced by reducing the alloy tin level, down to about 0.02 wt %. The minimum level of tin required to induce hyper-activation is believed to be between 0.005 and 0.01 wt %. Below this level only active aluminium dissolution, condition 4, is observed.

Figure 4:
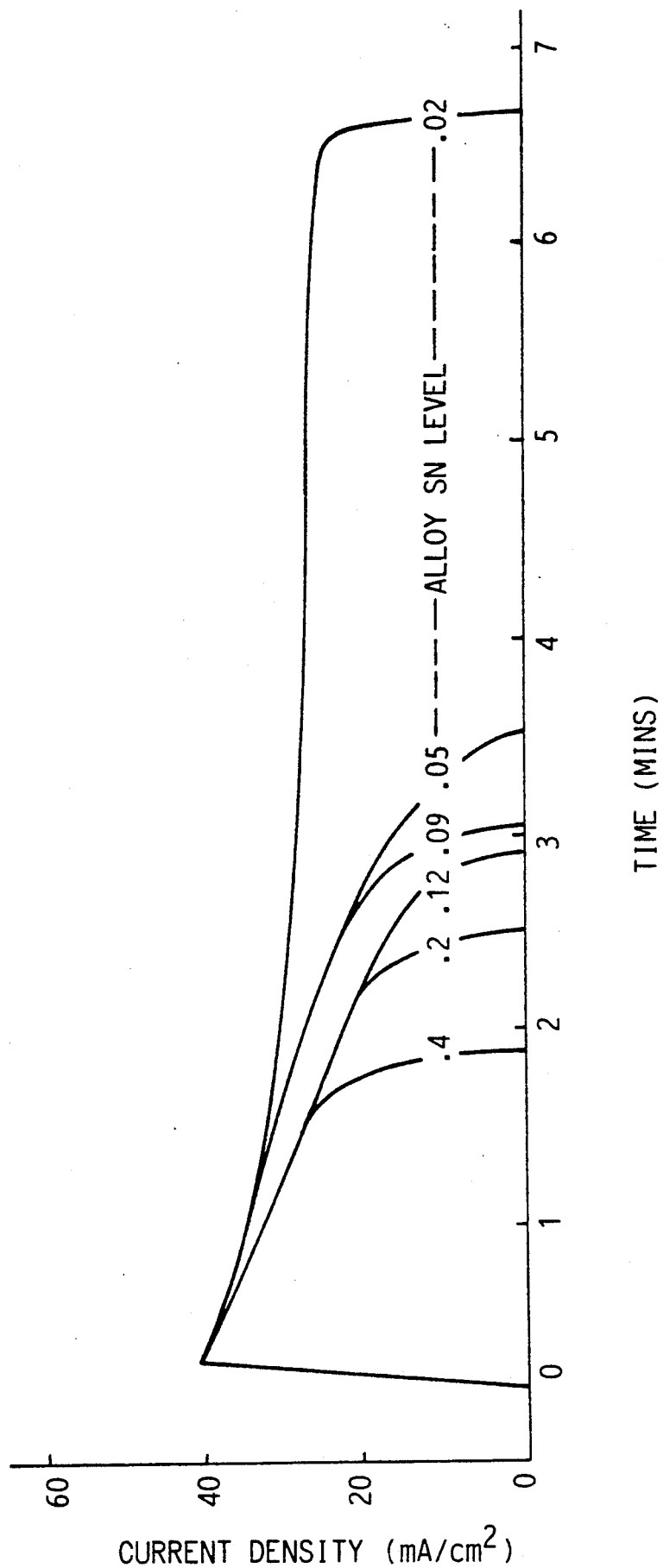
FIG. 4 is a graph of current density against time obtained in rotating disk electrode experiments using tin binary alloys in 4M NaOH at 25° C.

The stability of anode discharge in the hyper-active condition has been investigated at a potential of $-2.0$ V and 40 mA/cm$^2$ (FIG. 4). The polarization experiments shown in FIG. 3 were repeated but the potential scan was halted at $-2.0$ V, part way into the hyper-active range of each alloy. After initially discharging at 40 mA/cm$^2$ the current output of each anode decayed with time. The rate of decay increased with increasing alloy tin level.

On the basis of the results shown in FIGS. 3 and 4, it is clear that an optimum anode composition exists for the maximization of the potential range and to increase the stability of the hyperactive condition. For the binary alloys this optimum level is 0.02 wt %.

Figure 5:
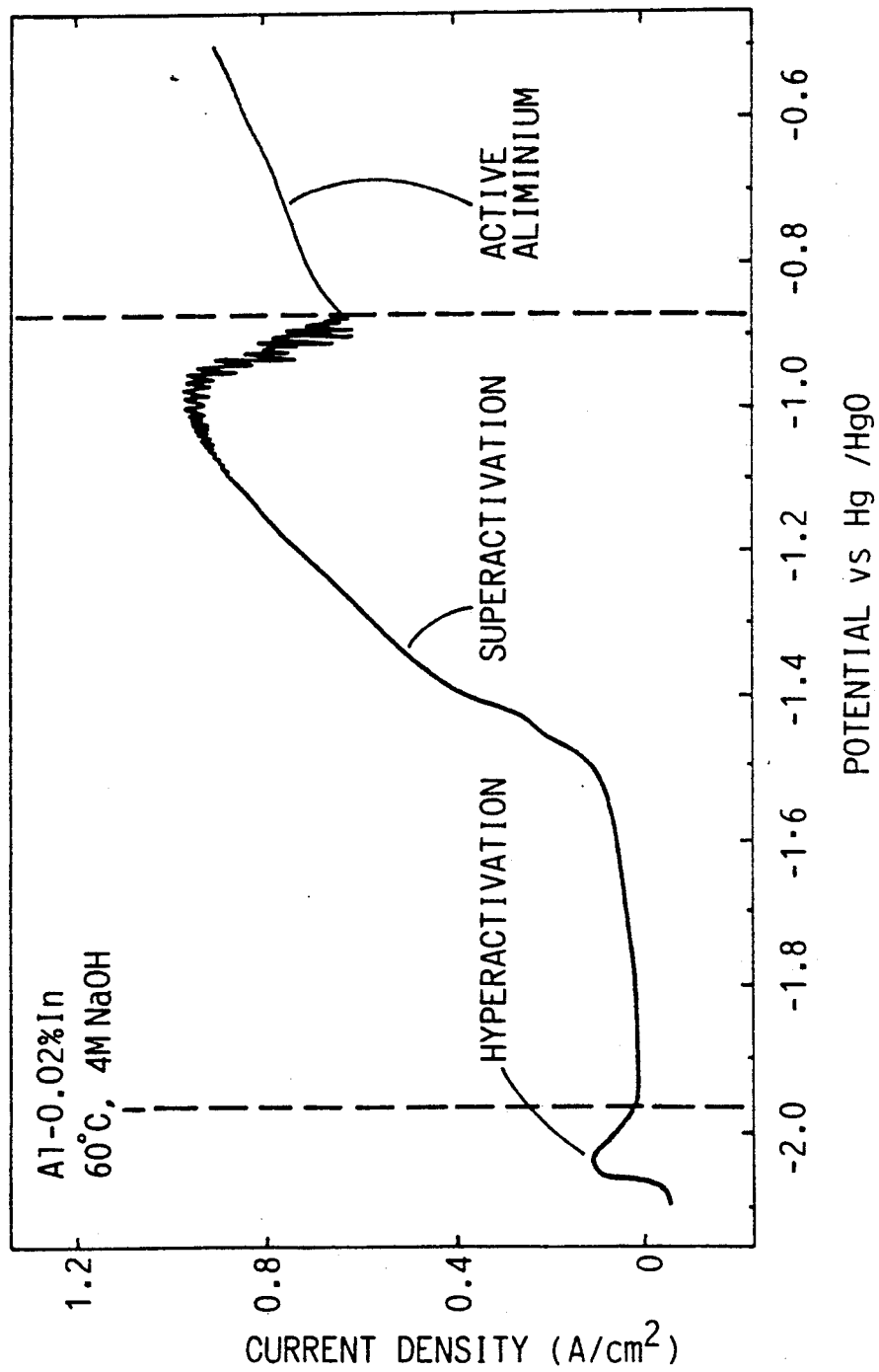

FIG. 5 shows the hyper-active condition for an Al-0.02% In alloy. In other experiments a transient hyper-active condition was generated in Al-In alloys containing 0.02% to 0.04% In.

EXAMPLE 2 ELECTROLYTE COMPOSITION

Figure 6B:
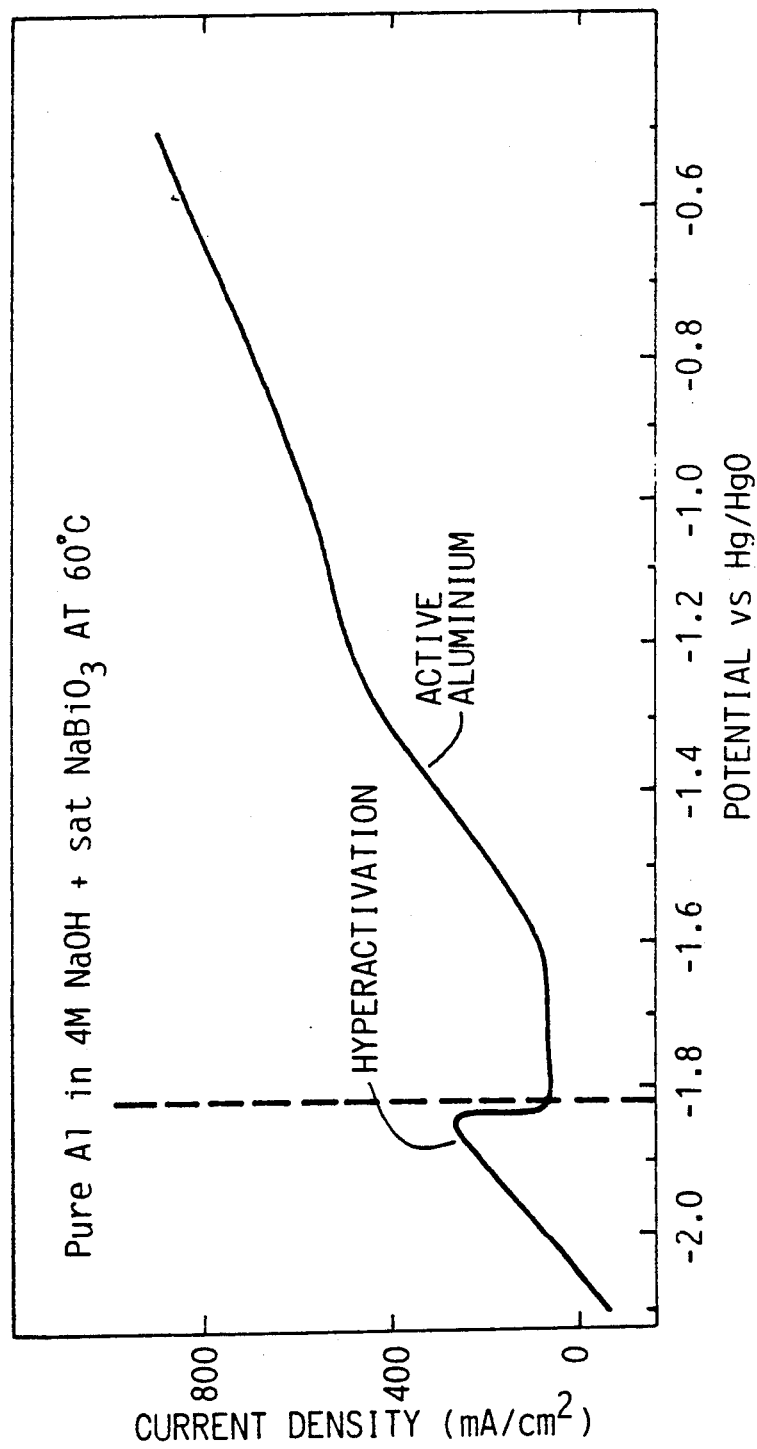

The hyperactive state has been observed in aluminium anodes which do not contain an activating element when tested in electrolytes containing tin, bismuth and antimony. FIG. 6 shows hyperactive peaks for pure aluminium tested in (a) tin or (b) bismuth doped caustic electrolytes. FIG. 10(b) shows a hyper-active peak for pure aluminium tested in an antimony doped electrolyte.

EXAMPLE 3 ELECTROLYTE HYDRODYNAMICS

A series of experiments performed in an aluminium air battery have shown that vigorous electrolyte flow (turbulent hydrodynamics) helps to stabilize the hyper-active condition. A 0.02% Sn binary anode tested in the hyper-active condition at 40 mA/cm$^2$ using an electrolyte flow rate of 100 ml/min remained stable for about 12 minutes. Increasing the flow rate to 300 ml/min produced completely stable discharge such that the anode was consumed after about 40 minutes. This higher flow rate has also allowed stable hyper-active discharge in an aluminium air battery at 700 mA/cm$^2$.

EXAMPLE 4 ELECTROCHEMICAL CONDITIONING

Figure 7A:
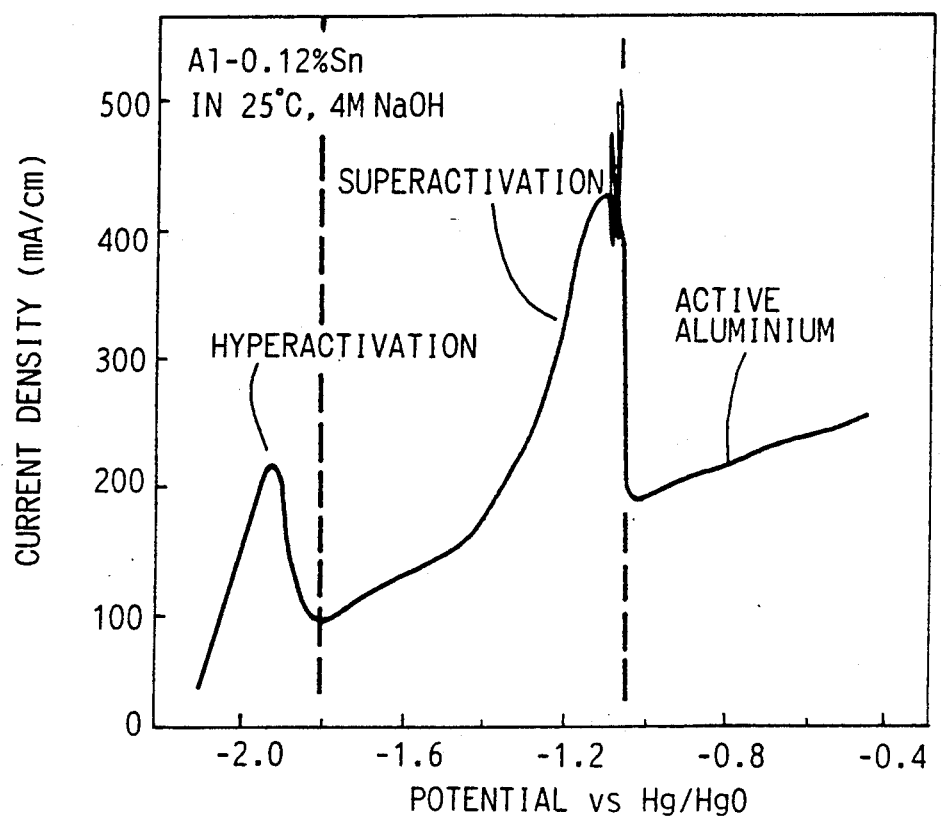
Figure 7B:
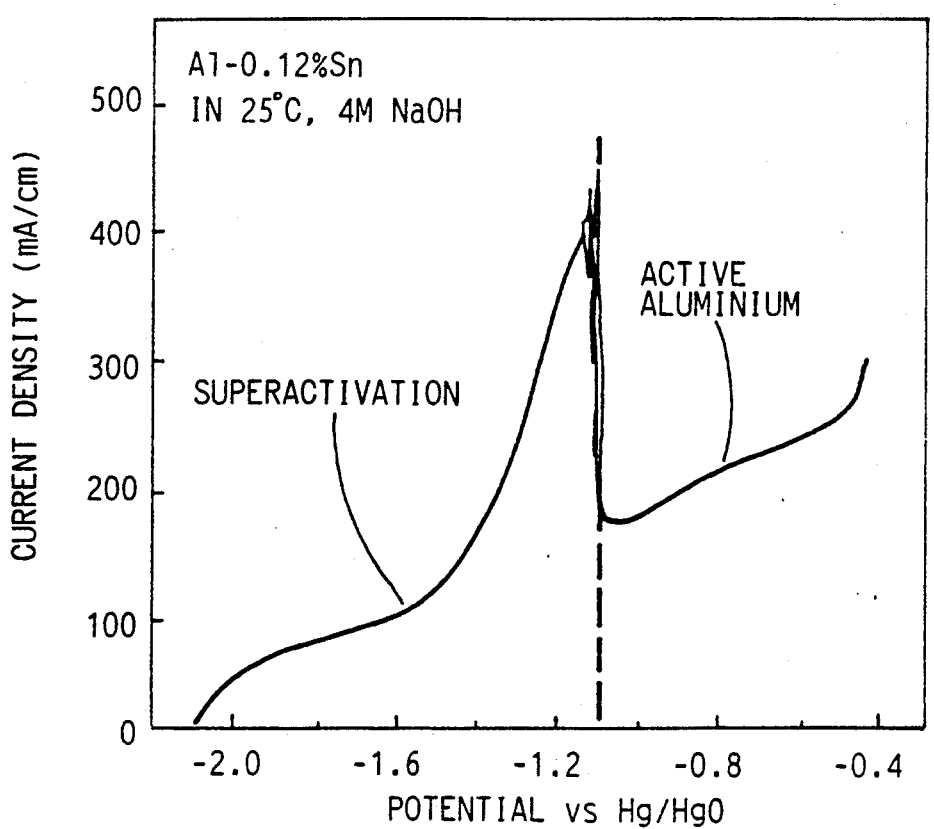

As has been stated it is generally not possible to observe or stabilize the hyper-active condition in any alloy/electrolyte couple unless the initial reaction occurs at either open circuit or under negative polarization conditions. FIG. 7 illustrates the necessity of electrochemical conditioning.

FIG. 7 (a) is a repeat of the 0.12% Sn polarization line from FIG. 3. This line was generated by initially polarizing the anode negatively to $-2.1$ V and then scanning the potential up to $-0.5$ V. As has been described, under these reaction conditions, this anode shows three electrochemical states; hyper-activation, super-activation and active aluminium dissolution (note: active tin dissolution is not observed as there are no second phase particles present in the alloy).

FIG. 7 (b) was generated by initially polarizing the anode to $-0.5$ V and then scanning to $-2.1$ V (i.e. the reverse of curve (a)). In this experiment no hyper-activation is observed. This result illustrates that it is not possible for anodes in the naturally occurring super-active state to exhibit hyper-activation. The same difference in polarization behaviour between forward and reverse scans is observed with all hyper-active alloy/electrolyte systems.

EXPERIMENTAL

The hyper-active condition has been studied in both a flowing electrolyte aluminium/air battery, the micro-cell, and a rotating disc electrode half cell. Brief experimental details of the two techniques employed are given below:

1. ROTATING DISC ELECTRODE EXPERIMENTS.

In this technique 0.5 cm$^2$ discs of aluminium alloy were rotated at 20 Hz face down in a circular electrochemical half cell containing 500 ml of 4M NaOH at 25° or 60° C. The rotation of the aluminium disc helped to continuously remove any hydrogen which was produced during reactions while maintaining constant hydrodynamic (electrolyte flow) conditions over the electrode surface. The cell was essentially a PTFE beaker incorporating two stationary electrodes;

(i) Counter electrode.

This was a 1" wide strip of platinized titanium arranged around the inner wall of the cell.

(ii) Reference electrode.

This was a Hg/HgO electrode mounted in an adjacent chamber filled with 4M NaOH and connected to the main cell by a column of electrolyte in a luggin capilliary. This luggin was centrally located in the main cell, pointing upwards.

In each experiment the rotating aluminium working electrode disc, was lowered into the electrolyte such that it rested 2 mm above the reference luggin. It was then locked into position and potentiostatic polarization experiments were performed. In these experiments the potential between the aluminium disc and the reference electrode was controlled and swept between pre-set values by means of a potentiostat and a linear sweep generator and the current flowing between the working and counter electrodes was recorded.

Figure 10A:
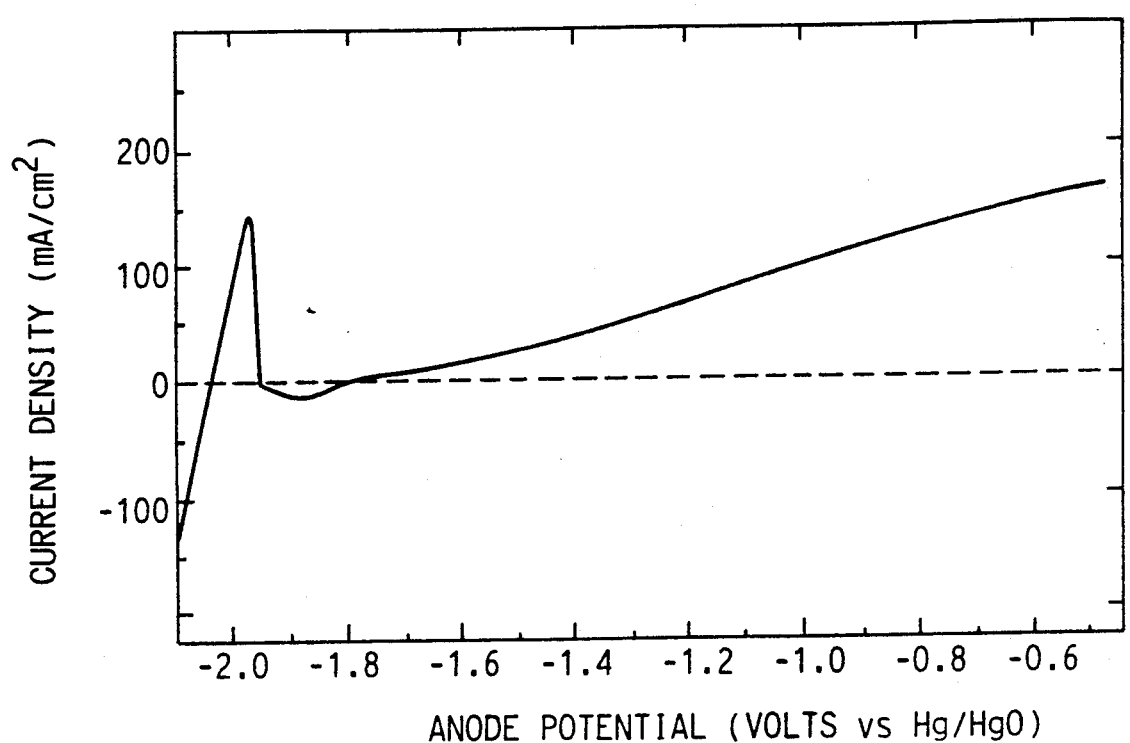
Figure 10B:
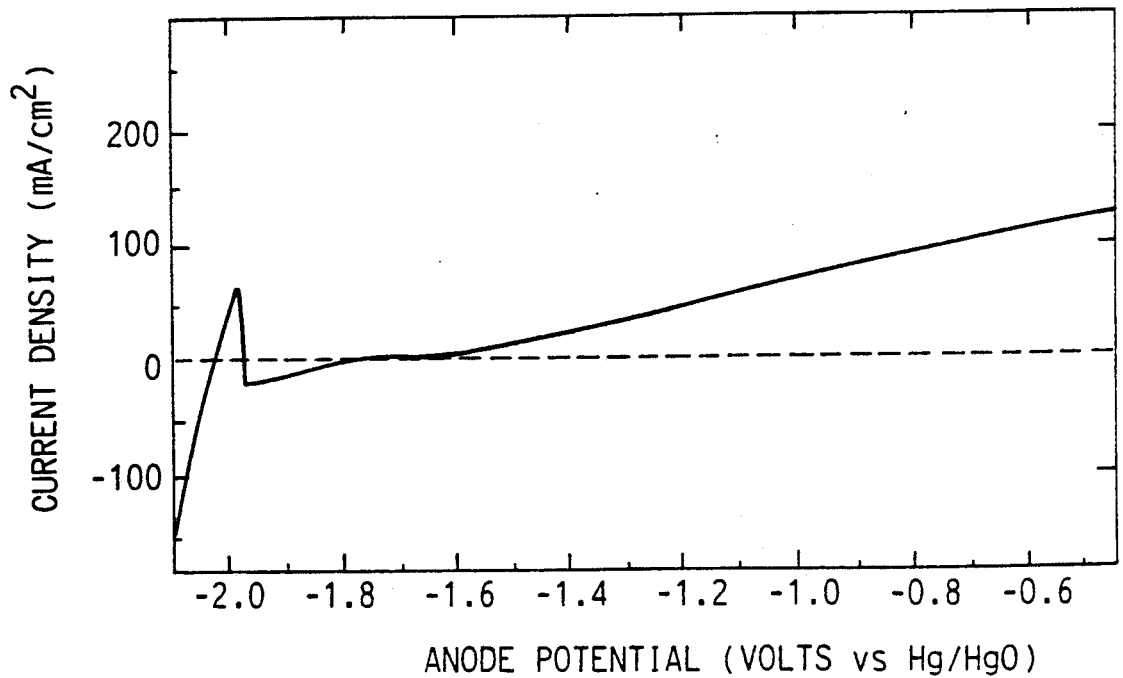

In this way polarization performance (potential versus current density) plots of aluminium alloys in 4M NaOH were generated, and are shown in FIG. 8, 9 and 10.

2. MICRO-CELL EXPERIMENTS

The micro-cell is a small, vertically mounted flowing electrolyte aluminium/air battery which uses a 1 cm$^2$ aluminium disc, working electrode facing a 1 cm$^2$ air cathode with a cell gap of 6 mm. In the side wall of the cell was a 0.5 mm diameter luggin hole which was connected to a separate electrolyte chamber containing a Hg/HgO reference electrode. (In this system all the electrodes were stationary).

A 3 liter electrolyte reservoir was connected to the cell by means of plastic tubing. The cell outlet was connected back to the reservoir. 4M NaOH at 25° or 60° C. contained in the reservoir was passed through the system by means of a peristaltic pump. Electrolyte flow rate was controllable between 100 and 300 ml/min. Because of the cell reaction chamber geometry turbulent hydrodynamic conditions operated during the experiments. Any hydrogen generated during the dissolution reactions was removed from the cell chamber by the upward flowing electrolyte.

In each experiment the cell was discharged against an external, variable resistance and the cell voltage, current density and anode potential were recorded.

I claim:

1. A battery comprising an aluminium anode, an aqueous electrolyte and a cathode, wherein at least one of the electrolyte and the anode contains at least one hyper-activating element in a concentration allowing the anode to be brought to a hyper-active state, the battery comprising also means for polarizing the anode to a potential of −1.8 V or more negative in the presence of the electrolyte, and means for maintaining rapid relative movement between the anode and the electrolyte.

2. A battery as claimed in claim 1, also including means for starting to draw current only when that potential is −1.8 V or more negative.

3. A battery comprising an Al anode, an aqueous electrolyte and a cathode, wherein at least one of the electrolyte and the anode contains at least one hyper-activating element at a concentration allowing the anode to be brought to a hyper-active state, the at least one hyper-activating element having the property of being reduced at a first electronegative potential to a species which does not accumulate at the anode surface, the $Al/Al^{3+}$ reversible potential constituting a second electronegative potential more electronegative than the first, and means for bringing the anode to a chosen electro-negative potential intermediate the said first and second potentials, the anode and the electrolyte being substantially free of elements which are thermodynamically stable in metallic form at the chosen potential, wherein there are provided means for maintaining rapid relative movement between the anode and the electrolyte.

4. A battery as claimed in claim 3, also including means for starting to draw current only when the anode is at the chosen electronegative potential intermediate the said first and second potentials.

5. A battery as claimed in claim 1, wherein at least one activating element is selected from Cd, Sn, Bi, Sb, In, Ge, B, Se, Te, P, As, C, Re, Pd, Nb, Si and Zn.

6. A battery as claimed in claim 3, wherein at least one activating element is selected from the following list, the figure in brackets being the approximate first electronegative potential associated with that element:
Cd; Sn (−1.8 V); Bi (−1.6 V); Sb (−1.4 V); Zn.

7. A battery as claimed in claim 3, wherein at least one activating element is selected from the following list, the figure in brackets being the approximate first electronegative potential associated with that element:
Se; Te; Ge (−1.7 V); As; P (−1.5 V); B (−1.8 V).

8. A battery as claimed in claim 1, wherein the electrolyte is alkaline.

9. A battery as claimed in claim 1, wherein at least one activating element is present in solid solution in the anode.

10. A battery as claimed in claim 1, wherein the anode contains tin at a concentration of 0.01 to 0.5% by weight.

11. A method of operating a battery having an aluminium anode, an aqueous electrolyte and a cathode, wherein at least one of the anode and the electrolyte contains at least one hyper-activating element in a concentration allowing the anode to be brought to a hyper-active state, which method comprises the steps of polarizing the anode to a potential of −1.8 V or more negative in the presence of the electrolyte so as to bring the anode to the hyper-active state, and controlling the electrolyte hydrodynamics so as to maintain the anode in the hyper-active state.

12. A method of operating a battery comprising an Al anode, an aqueous electrolyte and a cathode, wherein at least one of the electrolyte and the anode contains at least one hyper-activating element at a concentration allowing the anode to be brought to a hyper-active state, the at least one hyper-activating element having the property of being reduced at a first electronegative potential in the electrolyte to a species which does not accumulate at the anode surface, the $Al/Al^{3+}$ reversible potential constituting a second electronegative potential more electronegative than the first, which method comprises polarizing the anode to a chosen electronegative potential intermediate the said first and second potentials in the presence of the electrolyte so as to bring the anode to the hyper-active state, and maintaining rapid relative movement between the anode and the electrolyte.

13. A method as claimed in claim 11, wherein the anode is initially deactivated by being polarized to a more positive potential.

14. A method as claimed in claim 12, wherein the electrolyte hydrodynamics are controlled to provide turbulent flow past the anode so as to maintain the anode in the hyper-active state.

15. A method as claimed in claim 12, wherein the battery is used as a generator of hydrogen gas.

* * * * *